United States Patent
Luo et al.

(10) Patent No.: US 12,262,390 B2
(45) Date of Patent: Mar. 25, 2025

(54) COMMUNICATION METHOD AND APPARATUS

(71) Applicant: HUAWEI TECHNOLOGIES CO., LTD., Shenzhen (CN)

(72) Inventors: Zhihu Luo, Beijing (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 17/708,307

(22) Filed: Mar. 30, 2022

(65) Prior Publication Data
US 2022/0232615 A1 Jul. 21, 2022

Related U.S. Application Data

(63) Continuation of application No. PCT/CN2019/109770, filed on Sep. 30, 2019.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2021/0051636 A1* | 2/2021 | Sengupta | ............. | H04B 1/7143 |
| 2022/0132495 A1* | 4/2022 | Bae | ........................ | H04W 72/02 |

FOREIGN PATENT DOCUMENTS

| | | |
|---|---|---|
| CN | 104065605 A | 9/2014 |
| CN | 105897373 A | 8/2016 |
| WO | 2014146507 A1 | 9/2014 |
| WO | 2018082649 A1 | 5/2018 |

OTHER PUBLICATIONS

ZTE: "Consideration on scheduling enhancement for MTC", 2019, 3GPP Draft; R1-1908257, p. 1-16. (Year: 2019).*
Nokia, Nokia Shanghai Bell, "Scheduling of multiple DL/UL transport blocks," [online], 3GPP TSG RAN WG1 #98 R1-1908293, Prague, Czech Republic, Aug. 26-30, 2019; 7 total pages.

(Continued)

*Primary Examiner* — Derrick W Ferris
*Assistant Examiner* — Keith Follansbee
(74) *Attorney, Agent, or Firm* — Rimon PC

(57) ABSTRACT

A communication method and apparatus are provided. The method includes: A terminal device receives first indication information sent by a network device. The terminal device determines a target transmission mode of N TBs based on the first indication information, where the target transmission mode is a sequential transmission mode or an interleaved transmission mode. The terminal device receives the N TBs from the network device based on the target transmission mode. According to the method and the apparatus in this application, the terminal device can receive, based on different transmission modes, DCI and a plurality of TBs that are scheduled by using the DCI.

16 Claims, 12 Drawing Sheets

(56) References Cited

OTHER PUBLICATIONS

Sierra Wireless, "LTE-M Multiple Transport Block Grant Design Considerations" [online], 3GPP TSG RAN WG1 #96bis, R1-1903907, Xi'an China, Apr. 8-12, 2019; 13 total pages.
Ericsson, "Feature lead summary for Scheduling of multiple DL/UL transport blocks for LTE-MTC," [online], 3GPP TSG RAN WG1 #96bis, Xi'an China, Apr. 8-12, 2019, R1-1905534, 17 total pages.
3GPP TSG RAN WG1 NR Ad-Hoc Meeting,R1-1700026,Scheduling scheme for slot aggregation,Huawei, HiSilicon, Spokane, USA, Jan. 16-20, 2017,total 6 pages.
3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15), 962 pages.
3GPP TS 36.211 V14.12.0:3rd Generation Partnership Project;Technical Specification Group Radio Access Network;Evolved Universal Terrestrial Radio Access (E-UTRA);Physical channels and modulation(Release 14),Sep. 2019,total 196 pages.
3GPP TS 36.213 V15.7.0:"3rd Generation Partnership Project;Technical Specification Group Radio Access Network;Evolved Universal Terrestrial Radio Access (E-UTRA);Physical layer procedures(Release 15)",Sep. 2019,total 551 pages.
ZTE: "Consideration on scheduling enhancement for MTC", 3GPP Draft; R1-1908257, Aug. 17, 2019, XP051764871; 16 total pages.
Ericsson: "Feature lead summary #2 for Scheduling of multiple DL/ULtransport blocks for L TE-MTC", 3GPP Draft; R1-1909698, Sep. 3, 2019, XP051766292; 6 total pages.
Huawei et al: "Scheduling of multiple transport blocks", 3GPP Draft; R1-1908080, Aug. 17, 2019, XP051764703; 10 total pages.

\* cited by examiner

COMMUNICATION METHOD AND APPARATUS

CROSS-REFERENCE TO RELATED APPLICATIONS

This application is a continuation of International Application No. PCT/CN2019/109770, filed on Sep. 30, 2019, the disclosure of which is hereby incorporated by reference in its entirety.

TECHNICAL FIELD

This application relates to the field of communication technologies, and in particular, to a communication method and apparatus.

BACKGROUND

A narrowband internet of things (NB-IoT) is a network oriented to machine type communication (MTC), and is an important network in the future communication field. Prior to release (Rel) 16 narrowband internet of things (NB-IoT) system, one piece of downlink control information (DCI) was allowed to be used to schedule one transport block (TB). A scheduling enhancement feature, that one piece of DCI is allowed to be used to schedule a plurality of TBs, is introduced into the Rel-16 NB-IoT system. Compared with features in releases earlier than R16, this feature has the advantage of reducing signaling overheads.

In a wireless communication system, a transport block (TB) may be transmitted in different transmission modes. For the scheduling enhancement feature that one piece of DCI is used to schedule a plurality of TBs, how a terminal device determines a transmission mode of the plurality of TBs, and the pattern used to transmit the plurality of TBs in the determined transmission mode, is a current research hotspot.

SUMMARY

For a multi-TB scheduling scenario, this application provides a method and an apparatus for determining a transmission mode of a plurality of TBs and a pattern used to transmit the plurality of TBs in the determined transmission mode.

According to a first aspect, a communication method is provided. The method includes: A terminal device receives first indication information sent by a network device. The terminal device determines a target transmission mode of N TBs based on the first indication information, where the target transmission mode is a sequential transmission mode or an interleaved transmission mode, and the N TBs are scheduled by using downlink control information DCI. The terminal device receives the N TBs from the network device based on the target transmission mode.

In this embodiment of this application, the terminal device may determine different target transmission modes based on first indication information having different content, and may receive, based on the different target transmission modes, the DCI and a plurality of TBs that are scheduled by using the DCI, thereby meeting transmission requirements in the different transmission modes.

In a possible design, the first indication information is used to indicate that the target transmission mode is the sequential transmission mode or the interleaved transmission mode; and when the first indication information indicates that the target transmission mode is the interleaved transmission mode, the terminal device determines that the target transmission mode is the interleaved transmission mode; or when the first indication information indicates that the target transmission mode is the sequential transmission mode, the terminal device determines that the target transmission mode is the sequential transmission mode.

In a possible design, the first indication information includes a maximum repetition quantity $R_{max}$ of a downlink control channel; and when $R_{max}$ is greater than or equal to a first threshold, the terminal device determines that the target transmission mode is the interleaved transmission mode; or
when $R_{max}$ is less than a first threshold, the terminal device determines that the target transmission mode is the sequential transmission mode.

In this embodiment of this application, the target transmission mode is implicitly indicated by using the maximum repetition quantity of the downlink control channel. Compared with specifying the target transmission mode by using explicit signaling, this can reduce signaling overheads. When $R_{max}$ is greater than or equal to the first threshold, it indicates that downlink coverage is poor or downlink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $R_{max}$ is less than the first threshold, it indicates that downlink coverage is good or downlink channel quality is good; in this case, usually, the transmission duration of the terminal device is short, and the terminal device determines that the target transmission mode is the sequential transmission mode. In this case, a time diversity gain is low, and transmission of the terminal device can be simply implemented by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; and $TB_k$ is one of the N TBs.

When $M_{rep}^{NPDSCH} \times N_{SF}$ is greater than or equal to a second threshold, the terminal device determines that the target transmission mode is the interleaved transmission mode; or
when $M_{rep}^{NPDSCH} \times N_{SF}$ is less than a second threshold, the terminal device determines that the target transmission mode is the sequential transmission mode.

In this embodiment of this application, the target transmission mode is implicitly indicated by using scheduling information, the repetition quantity indication information, and the resource allocation indication information in the DCI. Compared with specifying the target transmission mode by using explicit signaling, this can reduce signaling overheads. When $M_{rep}^{NPDSCH} \times N_{SF}$ is greater than or equal to the second threshold, it indicates that transmission duration is long, and the terminal device determines that the target transmission mode is the interleaved transmission mode. In this case, a high time diversity gain can be obtained by using the interleaved transmission mode. When $M_{rep}^{NPDSCH} \times N_{SF}$ is less than the second threshold, it indicates that transmission duration is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes a modulation and coding scheme MCS of $TB_k$; and $TB_k$ is one of the N TBs. When the MCS is less than or equal to a third threshold, the terminal device determines that the target transmission mode is the interleaved transmission mode; or when the MCS is greater than a third threshold, the terminal device determines that the target transmission mode is the sequential transmission mode.

In this embodiment of this application, the target transmission mode is implicitly indicated by using the MCS in the DCI. Compared with specifying the target transmission mode by using explicit signaling, this can reduce signaling overheads. When the MCS is less than or equal to the third threshold, it indicates that downlink coverage is poor or downlink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When the MCS is greater than the third threshold, it indicates that downlink coverage is good or downlink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode is the interleaved transmission mode or the sequential transmission mode.

When the third indication information indicates that the target transmission mode is the interleaved transmission mode, and $M_{rep}^{NPDSCH}$ and $N_{SF}$ that are determined based on the second indication information satisfy that $M_{rep}^{NPDSCH} \times N_{SF}$ is greater than or equal to a second threshold, the terminal device determines that the target transmission mode is the interleaved transmission mode; or when the third indication information indicates that the target transmission mode is the interleaved transmission mode, and $M_{rep}^{NPDSCH}$ and $N_{SF}$ that are determined based on the second indication information satisfy that $M_{rep}^{NPDSCH} \times N_{SF}$ is less than a second threshold, the terminal device determines that the target transmission mode is the sequential transmission mode; or when the third indication information indicates that the target transmission mode is the sequential transmission mode, the terminal device determines that the target transmission mode is the sequential transmission mode.

In this embodiment of this application, when the terminal device transmits a plurality of TBs, in addition to determining, based on the third indication information, whether to use interleaved transmission, the terminal device further determines, based on the second indication information in the currently received DCI, whether to use the interleaved transmission mode. Flexibility of indicating the target transmission mode can be improved by using the DCI. In addition, the second indication information is implicitly indicated by using scheduling information, the repetition quantity indication information, and the resource allocation indication information in the DCI. Compared with using explicit signaling in the DCI, this can reduce signaling overheads.

In a possible design, when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes, where p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

In this embodiment of this application, when the interleaved transmission mode is used for the plurality of TBs, the interleaving granularity is $p \times N_{SF} \times \min(M_{rep}^{NPUSCH}, 4)$ subframes or $p \times \min(M_{rep}^{NPUSCH}, 4)$ subframes, so that the time diversity gain can be maximized. Moreover, a subframe-level repetition structure may be reserved for each TB, and symbol-level combination may be performed on $\min(M_{rep}^{NPUSCH}, 4)$ repeated subframes to ensure demodulation performance. In addition, a frequency offset may be estimated by performing a differential operation on every two subframes in the $\min(M_{rep}^{NPUSCH}, 4)$ repeated subframes, and a data symbol in one subframe and a symbol in which a reference signal is located are used to estimate a frequency offset. Compared with estimating a frequency offset by using only the symbol in which the reference signal is located, this can improve frequency offset tracking performance.

According to a second aspect, a communication method is provided. The method includes: A terminal device receives first indication information sent by a network device. The terminal device determines a target transmission mode of N TBs based on the first indication information, where the target transmission mode is a sequential transmission mode or an interleaved transmission mode, and the N TBs are scheduled by using downlink control information DCI. The terminal device sends the N TBs to the network device based on the target transmission mode.

In this embodiment of this application, the terminal device may determine different target transmission modes based on first indication information having different content, and may receive, based on the different target transmission modes, the DCI and a plurality of TBs that are scheduled by using the DCI, thereby meeting transmission requirements in the different transmission modes.

In a possible design, the first indication information is used to indicate that the target transmission mode of the terminal device is the sequential transmission mode or the interleaved transmission mode; and when the first indication information indicates that the target transmission mode of the terminal device is the interleaved transmission mode, the terminal device determines that the target transmission mode is the interleaved transmission mode; or when the first indication information indicates that the target transmission mode of the terminal device is the sequential transmission mode, the terminal device determines that the target transmission mode is the sequential transmission mode.

In a possible design, the first indication information is carried in the DCI; the first indication information includes subcarrier indication information and a modulation and coding scheme MCS of $TB_k$; the subcarrier indication information is used to determine a quantity $N_{sc}^{RU}$ of consecutive subcarriers occupied by $TB_k$ in one resource unit RU; and $TB_k$ is one of the N TBs.

When $N_{sc}^{RU}$ is L, when the MCS is less than or equal to a fourth threshold, the terminal device determines that the target transmission mode is the interleaved transmission mode; or when the MCS is greater than a fourth threshold, the terminal device determines that the target transmission mode is the sequential transmission mode.

When $N_{sc}^{RU}$ is not L, when the MCS is less than or equal to a fifth threshold, the terminal device determines that the target transmission mode is the sequential transmission mode; or when the MCS is greater than a fifth threshold, the terminal device determines that the target transmission mode is the sequential transmission mode, where L is a positive integer.

Optionally, the fourth threshold is less than or equal to the fifth threshold.

In this embodiment of this application, the target transmission mode is implicitly indicated by using the MCS in the DCI. Compared with specifying the target transmission mode by using explicit signaling, this can reduce signaling overheads. When the MCS is less than or equal to the fourth threshold or the MCS is less than or equal to the fifth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When the MCS is greater than the fourth threshold or the MCS is greater than the fifth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{RU}$ of RUs to which an uplink data channel carrying $TB_k$ is mapped; and $TB_k$ is one of the N TBs.

When $M_{rep}^{NPUSCH} \times N_{RU}$ is greater than or equal to a sixth threshold, the terminal device determines that the target transmission mode is the interleaved transmission mode; or when $M_{rep}^{NPUSCH} \times N_{RU}$ is less than a sixth threshold, the terminal device determines that the target transmission mode is the sequential transmission mode, where $N_{slots}^{UL}$ is a quantity of consecutive slots in one RU.

In this embodiment of this application, the target transmission mode is implicitly indicated by using scheduling information, the repetition quantity indication information, and the resource allocation indication information in the DCI. Compared with specifying the target transmission mode by using explicit signaling, this can reduce signaling overheads. When $M_{rep}^{NPUSCH} \times N_{RU}$ is greater than or equal to the sixth threshold, it indicates that transmission duration is long, and the terminal device determines that the target transmission mode is the interleaved transmission mode. In this case, a high time diversity gain can be obtained by using the interleaved transmission mode. When $M_{rep}^{NPUSCH} \times N_{RU}$ is less than the sixth threshold, it indicates that transmission duration is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When $N_{sc}^{RU}$ is L, the terminal device determines that the target transmission mode is the interleaved transmission mode; or when $N_{sc}^{RU}$ is not L, the terminal device determines that the target transmission mode is the sequential transmission mode, where L is a positive integer.

In a possible design, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When $N_{sc}^{RU}$ is less than or equal to L1, the terminal device determines that the target transmission mode is the interleaved transmission mode; or when $N_{sc}^{RU}$ is greater than L1, the terminal device determines that the target transmission mode is the sequential transmission mode, where L1 is a positive integer.

In this embodiment of this application, the target transmission mode is implicitly indicated by using scheduling information and the subcarrier indication information in the DCI. Compared with specifying the target transmission mode by using explicit signaling, this can reduce signaling overheads. When $N_{sc}^{RU}$ is less than or equal to L1, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{sc}^{RU}$ is greater than L1, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; and $N_{sc}^{RU}$ is L.

When a subcarrier spacing is 3.75 kHz, when $N_{RU}$ is greater than or equal to a seventh threshold, the terminal device determines that the target transmission mode is the interleaved transmission mode; or when $N_{RU}$ is less than a seventh threshold, the terminal device determines that the target transmission mode is the sequential transmission mode.

When a subcarrier spacing is 15 kHz, when $N_{RU} \times M_{rep}^{NPUSCH}$ is greater than or equal to an eighth threshold, the terminal device determines that the target transmission mode is the interleaved transmission mode; or when $N_{RU} \times M_{rep}^{NPUSCH}$ is less than an eighth threshold, the terminal device determines that the target transmission mode is the sequential transmission mode, where the eighth threshold is greater than or equal to the seventh threshold.

In this embodiment of this application, the target transmission mode is implicitly indicated by using scheduling information, the subcarrier indication information, the resource allocation indication information, and the repetition quantity indication information in the DCI. Compared with specifying the target transmission mode by using explicit signaling, this can reduce signaling overheads. When $N_{RU}$ is greater than or equal to the seventh threshold or $N_{RU} \times M_{rep}^{NPUSCH}$ is greater than or equal to the eighth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{RU}$ is less than the seventh threshold or $N_{RU} \times M_{rep}^{NPUSCH}$ is less than the eighth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; $N_{sc}^{RU}$ is not equal to L; and L is a positive integer.

When $N_{RU} \times M_{rep}^{NPUSCH}$ is greater than or equal to a ninth threshold, the terminal device determines that the target transmission mode is the interleaved transmission mode; or when $N_{RU} \times M_{rep}^{NPUSCH}$ is less than a ninth threshold, the terminal device determines that the target transmission mode is the sequential transmission mode.

In this embodiment of this application, the target transmission mode is implicitly indicated by using scheduling information, the subcarrier indication information, the resource allocation indication information, and the repetition quantity indication information in the DCI. Compared with specifying the target transmission mode by using explicit signaling, this can reduce signaling overheads. When $N_{RU} \times M_{rep}^{NPUSCH}$ is greater than or equal to the ninth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{RU} \times M_{rep}^{NPUSCH}$ is less than the ninth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible design, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{RU}$ of RUs to which an uplink data channel carrying $TB_k$ is mapped; $TB_k$ is one of the N TBs; and the third indication information is used to indicate that the target transmission mode is the interleaved transmission mode or the sequential transmission mode.

When the third indication information indicates that the target transmission mode is the interleaved transmission mode, and $M_{rep}^{NPUSCH}$ and $N_{RU}$ that are determined based on the second indication information satisfy that $M_{rep}^{NPUSCH} \times N_{RU}$ is greater than or equal to a threshold a, the terminal device determines that the target transmission mode is the interleaved transmission mode; or when the third indication information indicates that the target transmission mode is the interleaved transmission mode, and $M_{rep}^{NPUSCH}$ and $N_{RU}$ that are determined based on the second indication information satisfy that $M_{rep}^{NPUSCH} \times N_{RU}$ is less than a threshold a, the terminal device determines that the target transmission mode is the sequential transmission mode; or when the third indication information indicates that the target transmission mode is the sequential transmission mode, the terminal device determines that the target transmission mode is the sequential transmission mode.

In a possible design, when the target transmission mode is the interleaved transmission mode, an interleaving granularity of the N TBs is ε RUs, or an interleaving granularity of the N TBs is $\varepsilon \times N_{RU} \times N_{slots}^{UL}$ slots.

$N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

In a possible design, when the target transmission mode is the interleaved transmission mode, an interleaving granularity of the N TBs is $p \times N_{RU} \times N_{slots}^{UL} \times \min(\lceil M_{rep}^{NPUSCH}/2 \rceil, 4)$ slots, or an interleaving granularity of the N TBs is $p \times \min(\lceil M_{rep}^{NPUSCH}/2 \rceil, 4)$ subframes, or an interleaving granularity of the N TBs is $2 \times p \times \min(\lceil M_{rep}^{NPUSCH}/2 \rceil, 4)$ slots.

$N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, $TB_k$ is one of the N TBs, and p is a positive integer.

In a possible design, when the target transmission mode is the interleaved transmission mode, when $N_{sc}^{RU}$ is L, an interleaving granularity of the N TBs is ε RUs, or an interleaving granularity of the N TBs is $\varepsilon \times N_{RU} \times N_{slots}^{UL}$ slots.

When the target transmission mode is the interleaved transmission mode, when $N_{sc}^{RU}$ is not L, an interleaving granularity of the N TBs is $p \times N_{RU} \times N_{slots}^{UL} \times \min(\lceil M_{rep}^{NPUSCH}/2 \rceil, 4)$ slots, or an interleaving granularity of the N TBs is $p \times \min(\lceil M_{rep}^{NPUSCH}/2 \rceil, 4)$ subframes, or an interleaving granularity of the N TBs is $2 \times p \times \min(\lceil M_{rep}^{NPUSCH}/2 \rceil, 4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, $TB_k$ is one of the N TBs, and ε, p, and L are all positive integers.

In a possible design, when the target transmission mode is the interleaved transmission mode, when $N_{sc}^{RU}$ is less than or equal to L2, an interleaving granularity of the N TBs is ε RUs, or an interleaving granularity of the N TBs is $\varepsilon \times N_{RU} \times N_{slots}^{UL}$ slots.

When the target transmission mode is the interleaved transmission mode, when $N_{sc}^{RU}$ is greater than L2, an interleaving granularity of the N TBs is $p \times N_{RU} \times N_{slots}^{UL} \times \min(\lceil M_{rep}^{NPUSCH}/2 \rceil, 4)$ slots, or an interleaving granularity of the N TBs is $p \times \min(\lceil M_{rep}^{NPUSCH}/2 \rceil, 4)$ subframes, or an interleaving granularity of the N TBs is $2 \times p \times \min(\lceil M_{rep}^{NPUSCH}/2 \rceil, 4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, $TB_k$ is one of the N TBs, and ε, p, and L2 are all positive integers.

In a possible design, M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N.

A first phase component of a baseband signal of a symbol α in the M symbols is determined based on a symbol index value corresponding to the symbol α, and the symbol α is one of the M symbols.

In a possible design, the symbol index values $\tilde{l}$ of the M symbols are $\tilde{l}$=0, 1, . . . , $N \times M_{rep}^{NPUSCH} \times N_{RU} \times \times N_{slots}^{UL} \times N_{symb}^{UL} - 1$.

$M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols included in one slot, and $TB_k$ is one of the N TBs.

In this embodiment, the symbol index values of the M symbols are reset to 0 at the transmission start moment of the N TBs, the symbol index values of the M symbols are sequentially increased in chronological order during transmission of the N TBs, and the maximum symbol index value of the M symbols is related to N, so that phase continuity of a plurality of TBs is ensured, thereby ensuring a low PAPR, facilitating cross-subframe channel estimation, and avoiding degradation of channel estimation performance caused by phase discontinuity.

According to a third aspect, an embodiment of this application provides a communication method. The method is applied to a network device, and the method includes: The network device determines a target transmission mode. The network device sends first indication information to a terminal device, where the first indication information is used to indicate the target transmission mode. The network device sends N TBs to the terminal device based on the target transmission mode, where the N TBs are scheduled by using downlink control information DCI.

In a possible design, when the network device determines that the target transmission mode is an interleaved transmission mode, the first indication information is used to indicate that the target transmission mode is the interleaved transmission mode; or when the network device determines that the target transmission mode is a sequential transmission mode, the first indication information is used to indicate that the target transmission mode is the sequential transmission mode.

In a possible design, the first indication information includes a maximum repetition quantity $R_{max}$ of a downlink control channel.

When the network device determines that the target transmission mode is the interleaved transmission mode, $R_{max}$ is greater than or equal to a first threshold; or when the network device determines that the target transmission mode is the sequential transmission mode, $R_{max}$ is less than a first threshold.

In a possible design, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{SF}$ of subframes to which a downlink data channel carrying $TB_k$ is mapped; and $TB_k$ is one of the N TBs.

When the network device determines that the target transmission mode is the interleaved transmission mode, $M_{rep}^{NPUSCH} \times N_{SF}$ is greater than or equal to a second threshold; or when the network device determines that the target transmission mode is the sequential transmission mode, $M_{rep}^{NPUSCH} \times N_{SF}$ is less than the second threshold.

In a possible design, the first indication information is carried in the DCI; the first indication information includes a modulation and coding scheme MCS of $TB_k$; and $TB_k$ is one of the N TBs.

When the network device determines that the target transmission mode is the interleaved transmission mode, the MCS is less than or equal to a third threshold; or when the network device determines that the target transmission mode is the sequential transmission mode, the MCS is greater than a third threshold.

In a possible design, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode of the terminal device is the interleaved transmission mode or the sequential transmission mode.

When the network device determines that the target transmission mode is the interleaved transmission mode, the third indication information is used to indicate that the target transmission mode of the terminal device is the interleaved transmission mode, and $M_{rep}^{NPUSCH}$ and $N_{SF}$ that are determined based on the second indication information satisfy that $M_{rep}^{NPDSCH} \times N_{SF}$ is greater than or equal to a second threshold; or when the network device determines that the target transmission mode is the interleaved transmission mode, the third indication information indicates that the target transmission mode is the interleaved transmission mode, and then when the network device determines that the target transmission mode is the sequential transmission mode, $M_{rep}^{NPDSCH}$ and $N_{SF}$ that are determined based on the second indication information satisfy that $M_{rep}^{NPDSCH} \times N_{SF}$ is less than a second threshold; or when the network device determines that the target transmission mode is the sequential transmission mode, the third indication information indicates that the target transmission mode is the sequential transmission mode.

In a possible design, when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes.

p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPDSCH}$ is the repetition quantity of $TB_k$, $M_{rep}^{NPUSCH}$ is determined based on the repetition quantity indication information in the DCI, and $TB_k$ is one of the N TBs.

According to a fourth aspect, an embodiment of this application provides a communication method. The method includes: A network device determines a target transmission mode. The network device sends first indication information to a terminal device, where the first indication information is used to indicate the target transmission mode. The network device receives, based on the target transmission mode, N TBs sent by the terminal device, where the N TBs are scheduled by using downlink control information DCI.

In a possible design, when the network device determines that the target transmission mode is an interleaved transmission mode, the first indication information is used to indicate that the target transmission mode is the interleaved transmission mode; or when the network device determines that the target transmission mode is a sequential transmission mode, the first indication information is used to indicate that the target transmission mode is the sequential transmission mode.

In a possible design, the first indication information is carried in the DCI; the first indication information includes subcarrier indication information and a modulation and coding scheme MCS of $TB_k$; the subcarrier indication information is used to determine a quantity $N_{sc}^{RU}$ of consecutive subcarriers occupied by $TB_k$ in one resource unit RU; and $TB_k$ is one of the N TBs.

When $N_{sc}^{RU}$ is L, when the network device determines that the target transmission mode is the interleaved transmission mode, the MCS is less than or equal to a fourth threshold; or when the network device determines that the target transmission mode is the sequential transmission mode, the MCS is greater than a fourth threshold.

When $N_{sc}^{RU}$ is not L, when the network device determines that the target transmission mode is the interleaved transmission mode, the MCS is less than or equal to a fifth threshold; or when the network device determines that the target transmission mode is the sequential transmission mode, the MCS is greater than a fifth threshold, where L is a positive integer.

In a possible design, the first indication information is carried in the DCI; the first indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{RU}$ of RUs to which an uplink data channel carrying $TB_k$ is mapped; and $TB_k$ is one of the N TBs.

When the network device determines that the target transmission mode is the interleaved transmission mode, $M_{rep}^{NPDSCH} \times N_{RU}$ is greater than or equal to a sixth threshold; or when the network device determines that the target transmission mode is the sequential transmission mode, $M_{rep}^{NPDSCH} \times N_{RU}$ is less than a sixth threshold.

In a possible design, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When the network device determines that the target transmission mode is the sequential transmission mode, $N_{sc}^{RU}$ is L; or when the network device determines that the target transmission mode is the interleaved transmission mode, $N_{sc}^{RU}$ is not L, where L is a positive integer.

In a possible design, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When the network device determines that the target transmission mode is the sequential transmission mode, $N_{sc}^{RU}$ is less than or equal to L1; or when the network device determines that the target transmission mode is the interleaved transmission mode, $N_{sc}^{RU}$ is greater than L1, where L1 is a positive integer.

In a possible design, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPDSCH}$ of $TB_k$; $TB_k$ is one of the N TBs; and $N_{sc}^{RU}$ is L.

When a subcarrier spacing is 3.75 kHz, when the network device determines that the target transmission mode is the interleaved transmission mode, $N_{RU}$ is greater than or equal to a seventh threshold; or when the network device determines that the target transmission mode is the sequential transmission mode, $N_{RU}$ is less than a seventh threshold.

When a subcarrier spacing is 15 kHz, when the network device determines that the target transmission mode is the interleaved transmission mode, $N_{RU} \times M_{rep}^{NPUSCH}$ is greater than or equal to an eighth threshold; or when the network device determines that the target transmission mode is the sequential transmission mode, $N_{RU} \times M_{rep}^{NPUSCH}$ is less than an eighth threshold, where the eighth threshold is greater than or equal to the seventh threshold.

In a possible design, the first indication information is carried in the DCI; the first indication information includes resource allocation indication information and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; $N_{sc}^{RU}$ is not equal to L; and L is a positive integer.

When the network device determines that the target transmission mode is the interleaved transmission mode, $N_{RU} \times M_{rep}^{NPDSCH}$ is greater than or equal to a ninth threshold; or when the network device determines that the target transmission mode is the sequential transmission mode, $N_{RU} \times M_{rep}^{NPUSCH}$ is less than a ninth threshold.

In a possible design, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{RU}$ of RUs to which an uplink data channel carrying $TB_k$ is mapped; $TB_k$ is one of the N TBs; and the third indication information is used to indicate that the target transmission mode of the terminal device is the interleaved transmission mode or the sequential transmission mode.

When the network device determines that the target transmission mode is the interleaved transmission mode, the third indication information is used to indicate that the target transmission mode of the terminal device is the interleaved transmission mode, and $M_{rep}^{NPDSCH}$ and $N_{RU}$ that are determined based on the second indication information satisfy that $M_{rep}^{NPDSCH} \times N_{RU}$ is greater than or equal to a threshold a; or when the network device determines that the target transmission mode is the interleaved transmission mode, the third indication information indicates that the target transmission mode is the interleaved transmission mode, and then when the network device determines that the target transmission mode is the sequential transmission mode, $M_{rep}^{NPDSCH}$ and $N_{RU}$ that are determined based on the second indication information satisfy that $M_{rep}^{NPDSCH} \times N_{RU}$ is less than a threshold a; or when the network device determines that the target transmission mode is the sequential transmission mode, the third indication information indicates that the target transmission mode is the sequential transmission mode.

In a possible design, when the target transmission mode is the interleaved transmission mode, an interleaving granularity of the N TBs is ε RUs, or an interleaving granularity of the N TBs is $\varepsilon \times N_{RU} \times N_{slots}^{UL}$ slots.

$N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

In a possible design, when the target transmission mode is the interleaved transmission mode, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPUSCH}/2 \rceil, 4)$ subframes, or an interleaving granularity of the N TBs is $2 \times p \times \min(\lceil M_{rep}^{NPUSCH}/2 \rceil, 4)$ slots.

$N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPDSCH}$ is the repetition quantity of $TB_k$, $M_{rep}^{NPDSCH}$ is determined based on the repetition quantity indication information in the DCI, $TB_k$ is one of the N TBs, and p is a positive integer.

In a possible design, when the target transmission mode is the interleaved transmission mode, when $N_{sc}^{RU}$ is L, an interleaving granularity of the N TBs is ε RUs, or an interleaving granularity of the N TBs is $ε×N_{RU}×N_{slots}^{UL}$ slots.

When the target transmission mode is the interleaved transmission mode, when $N_{sc}^{RU}$ is not L, an interleaving granularity of the N TBs is $p×N_{RU}×N_{slots}^{UL}×min(\lceil M_{rep}^{NPDSCH}/2\rceil,4)$ slots, or an interleaving granularity of the N TBs is $p×min(\lceil M_{rep}^{NPDSCH}/\rceil,4)$ subframes, or an interleaving granularity of the N TBs is $2×p×min(\lceil M_{rep}^{NPUSCH}/2\rceil,4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, $TB_k$ is one of the N TBs, and ε, p, and L are all positive integers.

In a possible design, when the target transmission mode is the interleaved transmission mode, when $N_{sc}^{RU}$ is less than or equal to L2, an interleaving granularity of the N TBs is ε RUs, or an interleaving granularity of the N TBs is $ε×N_{RU}×N_{slots}^{UL}$ slots.

When the target transmission mode is the interleaved transmission mode, when $N_{sc}^{RU}$ is greater than L2, an interleaving granularity of the N TBs is $p×N_{RU}×N_{slots}^{UL}×min(\lceil M_{rep}^{NPDSCH}/2\rceil,4)$ slots, or an interleaving granularity of the N TBs is $p×min(\lceil M_{rep}^{NPDSCH}/2\rceil,4)$ subframes, or an interleaving granularity of the N TBs is $2×p×min(\lceil M_{rep}^{NPDSCH}/2\rceil,4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPDSCH}$ is the repetition quantity of $TB_k$, $M_{rep}^{NPDSCH}$ is determined based on the repetition quantity indication information in the DCI, $TB_k$ is one of the N TBs, and ε, p, and L are all positive integers.

In a possible design, M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N.

A first phase component of a baseband signal of a symbol α in the M symbols is determined based on a symbol index value corresponding to the symbol α, and the symbol α is one of the M symbols.

In a possible design, the symbol index values Ĩ of the M symbols are Ĩ=0, 1, . . . , $N×M_{rep}^{NPDSCH}×N_{RU}×N_{slots}^{UL}×N_{symb}^{UL}-1$.

$M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols included in one slot, and $TB_k$ is one of the N TBs.

According to a fifth aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the first aspect or the possible designs of the first aspect. Optionally, the communication apparatus may further include the memory. Optionally, the communication apparatus may further include a transceiver, configured to support the communication apparatus in sending and/or receiving information in the foregoing method. Optionally, the communication apparatus may be a terminal device, or may be an apparatus in the terminal device, for example, a chip or a chip system. The chip system includes at least one chip, and the chip system may further include another circuit structure and/or a discrete device.

According to a sixth aspect, a communication apparatus is provided. The apparatus may be a terminal device, an apparatus in the terminal device, or an apparatus that can be used together with the terminal device. In a design, the apparatus may include modules that are in a one-to-one correspondence with the methods/operations/steps/actions described in the first aspect. The modules may be implemented by a hardware circuit, software, or a combination of a hardware circuit and software. For example, the apparatus may include a transceiver module and a processing module, and the transceiver module and the processing module may perform corresponding functions in any design example of the first aspect or corresponding functions in any design example of the second aspect. For functions of the transceiver module and the processing module, refer to the records in the first aspect and the second aspect. Details are not described herein again.

According to a seventh aspect, a communication apparatus is provided. The apparatus may be a network device, an apparatus in the network device, or an apparatus that can be used together with the network device. In a design, the apparatus may include modules that are in a one-to-one correspondence with the methods/operations/steps/actions described in the second aspect. The modules may be implemented by a hardware circuit, software, or a combination of a hardware circuit and software. For example, the apparatus may include a transceiver module, and the transceiver module is configured to perform a corresponding function in any design example of the third aspect or a corresponding function in any design example of the fourth aspect. For specific functions of the transceiver module, refer to the records in the second aspect. Details are not described herein again.

According to an eighth aspect, an embodiment of this application provides an apparatus. The apparatus includes a processor, configured to implement the method described in the first aspect, or configured to implement the method described in the second aspect. The apparatus may further include a memory, configured to store instructions and/or data. The memory is coupled to the processor. When the processor executes program instructions stored in the memory, the method described in the first aspect or the method described in the second aspect can be implemented. The apparatus may further include a communication interface. The communication interface is used by the apparatus to communicate with another device. For example, the communication interface may be a transceiver, a circuit, a bus, a module, a pin, or another type of communication interface. The other device may be a network device or the like. In a possible design, the apparatus includes:

the memory, configured to store the program instructions;

the communication interface, configured to receive first indication information sent by a network device; and the processor, configured to: determine a target transmission mode of N TBs based on first indication information, and control, based on a first transmission mode or a second transmission mode, the communication interface to receive DCI sent by the network device and a plurality of TBs that are scheduled by using the DCI.

The communication interface is further configured to receive the N TBs from the network device based on the target transmission mode, or send the N TBs to the network device.

For functions of the processor and the communication interface, refer to the records in the first aspect or the records in the second aspect. Details are not described herein again.

According to a ninth aspect, an embodiment of this application provides an apparatus. The apparatus includes a processor, configured to implement the method described in the third aspect, or configured to implement the method described in the fourth aspect. The apparatus may further include a memory, configured to store instructions and/or data. The memory is coupled to the processor. When the processor executes program instructions stored in the memory, the method described in the third aspect or the method described in the fourth aspect can be implemented. The apparatus may further include a communication interface. The communication interface is used by the apparatus to communicate with another device. For example, the communication interface may be a transceiver, a circuit, a bus, a module, a pin, or another type of communication interface. The other device may be a terminal device or the like. In a possible design, the apparatus includes:

the memory, configured to store the program instructions;

the processor, configured to determine a target transmission mode; and the communication interface, configured to send first indication information to a terminal device, where the first indication information is used to indicate the target transmission mode.

The communication interface is configured to send N TBs to the terminal device based on the target transmission mode, where the N TBs are scheduled by using DCI; or receive, based on the target transmission mode, N TBs sent by the terminal device.

For functions of the processor and the communication interface, refer to the records in the third aspect or the records in the fourth aspect. Details are not described herein again.

According to a tenth aspect, an embodiment of this application further provides a computer-readable storage medium, including instructions. When the instructions are run on a computer, the computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to an eleventh aspect, an embodiment of this application further provides a chip system. The chip system includes a processor, and may further include a memory, and is configured to implement the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. The chip system may include a chip, or may include a chip and another discrete component.

According to a twelfth aspect, an embodiment of this application further provides a computer program product, including instructions. When the computer program product runs on a computer, the computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to a thirteenth aspect, an embodiment of this application provides a system. The system includes the apparatus according to the fifth aspect or the sixth aspect and the apparatus according to the seventh aspect or the eighth aspect.

DESCRIPTION OF EMBODIMENTS

Figure 1A:
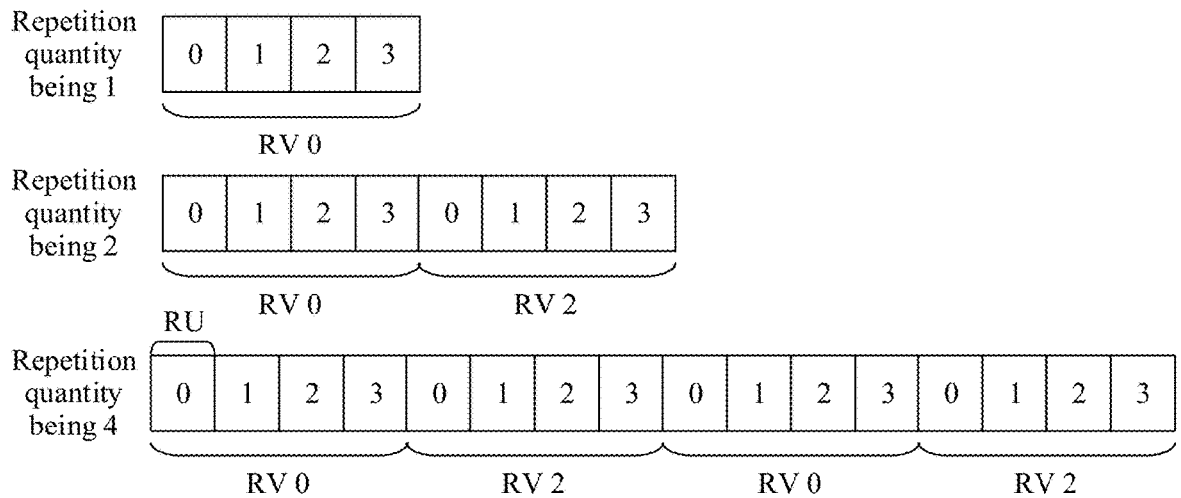
FIG. 1A to FIG. 1C are schematic diagrams of retransmission modes in a single-channel scenario or a multi-channel scenario according to embodiments of this application.

To make the objectives, the technical solutions, and advantages of embodiments of this application clearer, the following further describes embodiments of this application in detail with reference to the accompanying drawings.

The following describes some terms in embodiments of this application, to help a person skilled in the art have a better understanding.

(1) A terminal device includes a device that provides a user with voice and/or data connectivity, for example, the device may include a handheld device having a wireless connection function or a processing device connected to a wireless modem. The terminal device may communicate with a core network through a radio access network (RAN) and exchange a voice and/or data with the RAN. The terminal device may include user equipment (UE), a wireless terminal device, a mobile terminal device, a subscriber unit, a subscriber station, a mobile station, a remote station, an access point (AP), a remote terminal device, an access terminal device, a user terminal device, a user agent (, a user device, or the like. For example, the terminal device may include a mobile phone (or referred to as a "cellular" phone), a computer having a mobile terminal device, a portable, pocket-sized, handheld, computer built-in, or in-vehicle mobile apparatus, or a wearable intelligent device, for example, a device such as a personal communication service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example and not limitation, in embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs.

(2) A network device includes, for example, an access network (AN) device, for example, a base station (for example, an access point), and may be a device that is in an access network and that communicates with a wireless terminal device over an air interface through one or more cells. The network device may be configured to: mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (NodeB, eNB, or e-NodeB, evolutional NodeB) in a long term evolution (LTE) system or an LTE-advanced (LTE-A) system, or may include a next generation NodeB (gNB) in a fifth generation (5G) mobile communication technology new radio (NR) system, or may include a centralized unit (CU) and a distributed unit (DU) in a cloud access network (Cloud RAN) system. This is not limited in embodiments of this application.

(3) Machine type communication (MTC), also referred to as machine-to-machine communication (M2M) or the internet of things (IoT), as the name implies, is communication between objects. Further, machine type communication is communication between machines, and a communication node in this communication mode may be referred to as an MTC terminal. Future internet of things communication may mainly cover smart grids, smart agriculture, smart transportation, smart households, medical detection and monitoring, logistics detection, industrial detection and monitoring, the internet of vehicles, intelligent communities, environmental monitoring, and the like.

A type of important MTC communication system is a communication system based on an existing cellular network infrastructure, and this type of MTC communication is usually referred to as cellular MTC or cellular IoT (CIoT for short). The 3rd generation partnership project (3GPP) standardization organization has been paying close attention to development of cellular MTC and has actively carried out standardization of related technologies. Currently, a cellular MTC service mainly poses the following requirements on a network and UE:

Requirement for wide coverage: Currently, it can be learned that the MTC service usually does not need a very high service rate, but needs a capability to support wide coverage. Wide coverage means that an MTC base station uses a strong coverage enhancement technology to provide a communication service for user equipment with a high penetration loss (20 dB). For example, user equipments in smart households and intelligent meter reading services, for example, a smart water/electricity meter, are usually installed indoors or even in a basement. An existing cellular network technology can hardly provide a reliable communication service for devices at these locations, but an MTC base station needs to provide a stable connection service for such type of devices.

Large connection quantity: For internet of things terminal devices deployed on a large scale, such as smart water/electricity meters, smart communities, surveillance devices, vehicles, and wearable devices, one MTC base station may cover a huge quantity of terminal devices of this type (which is more than tens of thousands or even hundreds of thousands) that is far higher than an existing quantity of mobile terminals.

Low costs: Costs of MTC terminal devices need to be lower than costs of existing mobile terminals, and the low costs are a prerequisite for massively deploying MTC devices.

Low power consumption: MTC terminal devices are usually battery powered because of diversified actual application and various deployment environments of the MTC terminal devices. However, replacing batteries for the massive devices consumes enormous manpower and time. Therefore, functional components of an MTC device usually need to have an extremely low power consumption level, so that the device can have longer standby time, thereby reducing a quantity of times of battery replacement.

(4) Narrowband internet of things (NB-IoT) is an MTC-oriented network and an important network in the future communication field. Currently, in 3GPP standards, a new air interface is designed based on a cellular network to carry an IoT service by fully using characteristics of a narrowband technology. This type of IoT is referred to as NB-IoT. Compared with a conventional cellular network, a service and a terminal device in an NB-IoT system have the following features:

(1) Low service rate: Compared with the conventional cellular network, an NB-IoT service generates smaller data packets, and is usually delay-insensitive.

(2) Massive-connection requirement: One NB-IoT base station may serve a huge quantity of internet of things terminal devices deployed on a large scale, such as smart water/electricity meters, smart households, vehicles, and wearable devices. For example, there may be tens of thousands of internet of things terminal devices.

(3) Low-cost requirement: Compared with existing cellular network terminal devices, terminal devices in an NB-IoT system have lower costs, to implement massive deployment of terminal devices. The low-cost requirement requires very low implementation complexity of the terminal device.

(4) Low power consumption requirement: The NB-IoT system requires lower power consumption of the terminal device, to save battery power of the terminal device, ensure extra-long standby time of the terminal device, and reduce labor costs of battery replacement.

(5) Coverage enhancement requirement: Most NB-IoT systems are deployed in environments with poor network coverage. For example, electricity meters and water meters are usually installed indoors or basements in which wireless network signals are very poor. Therefore, coverage enhancement technologies are required to enhance network coverage.

To meet the foregoing requirements, the NB-IoT system has many unique designs. For example, a method of repeatedly sending is used for a control channel (for example, a narrowband physical downlink control channel (NPDCCH)) and a data channel (for example, a narrowband physical downlink shared channel (NPDSCH) or a narrowband physical uplink shared channel (NPUSCH)) of the NB-IoT system, to implement deep coverage. That is, the same content is sent repeatedly for hundreds of times, to increase the possibility of successfully receiving the content by a terminal device with poor coverage. There may be only one resource block (RB) for a deployed bandwidth, that is, 180 kHz, so that coverage of a cell is enhanced by 20 dB. In addition, a battery life of the terminal device can reach 10 years by reducing power consumption and complexity of the terminal device.

(5) A DMRS is a main reference signal used to estimate a channel characteristic. A distribution interval of the DMRS in the time domain may be less than or equal to a channel coherence duration, to estimate a time-varying channel more accurately.

(6) A subcarrier spacing (SCS) is a value of a spacing between center locations or peak locations of two adjacent subcarriers in the frequency domain in an orthogonal frequency division multiplexing OFDM system. For example, the SCS may be 15 kHz, 30 kHz, 60 kHz, 120 kHz, 240 kHz, or 480 kHz. For example, different subcarrier spacings may be integer multiples of 2. It may be understood that the SCS may alternatively be designed to another value. For example, a subcarrier spacing in an LTE system is 15 kHz; a subcarrier spacing in an NR system may be 15 kHz, 30 kHz, 60 kHz, 120 kHz, or the like; and a subcarrier spacing in the NB-IoT system may be 3.75 kHz or 15 kHz.

Lengths of slots corresponding to different subcarrier spacings are different. A length of a slot corresponding to a subcarrier spacing of 15 kHz is 0.5 ms, a length of a slot corresponding to a subcarrier spacing of 60 kHz is 0.125 ms, and the like. Correspondingly, lengths of symbols corresponding to different subcarrier spacings may also be different.

(7) Resource unit

In the NB-IoT system, $N_{symb}^{UL} N_{slots}^{UL}$ SC-FDMA symbols in time domain and $N_{sc}^{UL}$ consecutive subcarriers in the frequency domain are defined as one resource unit (RU). Combinations of $N_{sc}^{UL}$, $N_{slots}^{UL}$, and $N_{symb}^{UL}$ that are supported by a frame structure type 1 and a frame structure type 2 are shown in Table 1 and Table 2 respectively. Physical meanings of the symbols in Table 1 and Table 2 are as follows:

$\Delta f$ indicates a subcarrier spacing.

$N_{sc}^{RU}$ indicates a quantity of consecutive subcarriers in one uplink resource unit, which is referred to as a quantity of tones for short in subsequent embodiments. That $N_{sc}^{RU}=1$ is referred to as single-tone, and that $n_{sc}^{RU}>1$ is referred to as multi-tone. specifically, that $N_{sc}^{RU}=3$ is referred to as 3-tone, that $N_{sc}^{RU}=6$ is referred to as 6-tone, and that $N_{sc}^{RU}=12$ is referred to as 12-tone.

$N_{slots}^{UL}$ indicates a quantity of consecutive slots in one uplink resource unit.

$N_{symb}^{UL}$ indicates a quantity of SC-FDMA symbols in one uplink slot.

TABLE 1

(Combinations of $N_{sc}^{RU}$, $N_{slots}^{UL}$, and $N_{symb}^{UL}$ that are supported by the frame structure type 1)

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 2

(Combinations of $N_{sc}^{RU}$, $N_{slots}^{UL}$, and $N_{symb}^{UL}$ that are supported by the frame structure type 2)

| NPUSCH format | $\Delta f$ | Supported uplink-downlink subframe configuration | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

In an eMTC system, $M_{symb}^{UL} M_{slots}^{UL}$ SC-FDMA symbols in time domain and $M_{sc}^{RU}$ consecutive subcarriers in the frequency domain are defined as one resource unit RU.

When a PUSCH uses a sub-PRB resource allocation method, combinations of $M_{sc}^{RU}$, $M_{slots}^{UL}$, and $M_{symb}^{UL}$ that are supported by the frame structure type 1 and the frame structure type 2 are shown in Table 3. Physical meanings of the symbols in Table 1 and Table 2 are as follows:

$\Delta f$ indicates a subcarrier spacing.

$M_{sc}^{UL}$ indicates a quantity of subcarriers in the frequency domain when the PUSCH uses the sub-PRB resource allocation manner.

$M_{sc}^{RU}$ indicates a quantity of consecutive subcarriers in one uplink resource unit when the PUSCH uses the sub-PRB resource allocation manner.

$M_{slots}^{UL}$ indicates a quantity of slots in one uplink resource unit when the PUSCH uses the sub-PRB resource allocation manner.

$M_{symb}^{UL}$ indicates a quantity of SC-FDMA symbols in one uplink slot when the PUSCH uses the sub-PRB resource allocation manner.

TABLE 3

(Combinations of $M_{sc}^{RU}$, $M_{slots}^{UL}$, and $M_{symb}^{UL}$ that are supported by the frame structure type 1 and the frame structure type 2 when the PUSCH uses the sub-PRB resource allocation manner)

| Physical channel | $\Delta f$ | Modulation mechanism | $M_{sc}^{UL}$ | $M_{sc}^{RU}$ | $M_{slots}^{UL}$ | $M_{symb}^{UL}$ | Description |
|---|---|---|---|---|---|---|---|
| PUSCH | 15 kHz | $\pi/2$-BPSK | 12 | 3 | 16 | 7 | Two of three subcarriers are used |
| | | QPSK | | 3 | 8 | | |
| | | | | 6 | 4 | | |

It should be noted that, the frame structure type 1 is applied to full duplex and half duplex. The frame structure type 2 is applied only to TDD.

(7) NB-IoT uplink repetition

For an NB-IoT uplink repeated transmission mode, refer to the descriptions in section 10.1.3.6 in 3GPP TS 36.211 and section 16.5.1.2 in 3GPP TS 36.213. For ease of understanding, brief descriptions are provided below. For an uplink, an NPUSCH may be mapped to one or more resource units, a quantity of resource units is denoted as $N_{RU}$, and the $N_{RU}$ resource units need to be transmitted for $M_{rep}^{NPDSCH}$ times. After the NPUSCH is mapped to $N_{slots}$ slots, before the NPUSCH continues to be mapped to the following slots, the $N_{slots}$ slots need to be additionally repeated for $M_{identical}^{NPUSCH} - 1$ times, until all $M_{rep}^{NPUSCH} N_{RU} N_{slots}^{UL}$ sots are completely transmitted, where $$M_{identical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} ; \text{and}$$

$$N_{slots} = \begin{cases} 1 & \Delta f = 3.75 \text{ kHz} \\ 2 & \Delta f = 15 \text{ kHz} \end{cases}.$$

FIG. TA shows an example in a single-tone (single-channel) scenario (that is, $N_{sc}^{RU}=1$). An NPUSCH carrying one TB is mapped to four resource units RUs. The following figure shows cases in which repetition quantities are 1, 2, and 4. A difference from a downlink lies in that redundancy versions for different repetition quantities vary alternately between 0 and 2. A redundancy version for the first repetition is indicated by the network device.

Figure 1B:
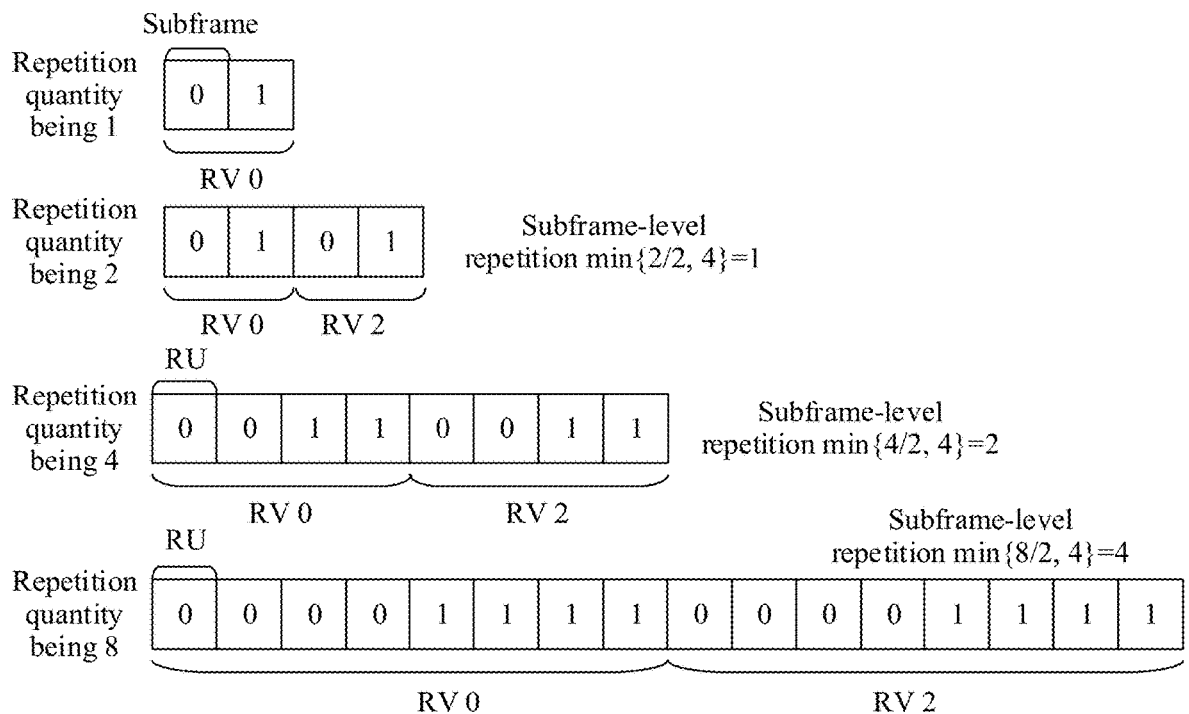

FIG. 1B shows an example in a multi-tone (multi-channel) scenario (that is, $N_{ss}^{RU}>1$). An NPUSCH carrying one TB is mapped to two resource units RUs. The following figure shows cases in which repetition quantities are 1, 2, 4, and 8. A difference from a downlink lies in that redundancy versions for $N_{RU} N_{slots}^{UL} * \min(\lceil M_{rep}^{NPDSCH}/2 \rceil, 4)$ different slots vary alternately between 0 and 2. A redundancy version for the first repetition is indicated by the network device. $N_{RU} N_{slots}^{UL} * \min(\lceil M_{rep}^{NPDSCH}/2 \rceil, 4)$ slots are used to describe a duration after subframe-level repetition is performed on both a subframe 0 and a subframe 1 in the following figure, and $N_{RU}$ is a quantity of resource units to which an NPUSCH carrying one TB is mapped.

(8) NB-IoT downlink repetition

For an NB-IoT downlink repeated transmission mode, refer to the descriptions in section 10.2.3.4 in 3GPP TS 36.211. For ease of understanding, brief descriptions are provided below. For a downlink, an NPDSCH may be mapped to one or more subframes, a quantity of subframes is denoted as $N_{SF}$, and the $N_{SF}$ subframes need to be transmitted for $M_{rep}^{NPDSCH}$ times. After the NPDSCH is mapped to one subframe, before the NPUSCH continues to be mapped to the following subframes, the subframe needs to be additionally repeated for $\min(M_{rep}^{NPDSCH}, 4) - 1$ times, until all $M_{rep}^{NPDSCH} N_{SF}$ subframes are completely transmitted.

Figure 1C:
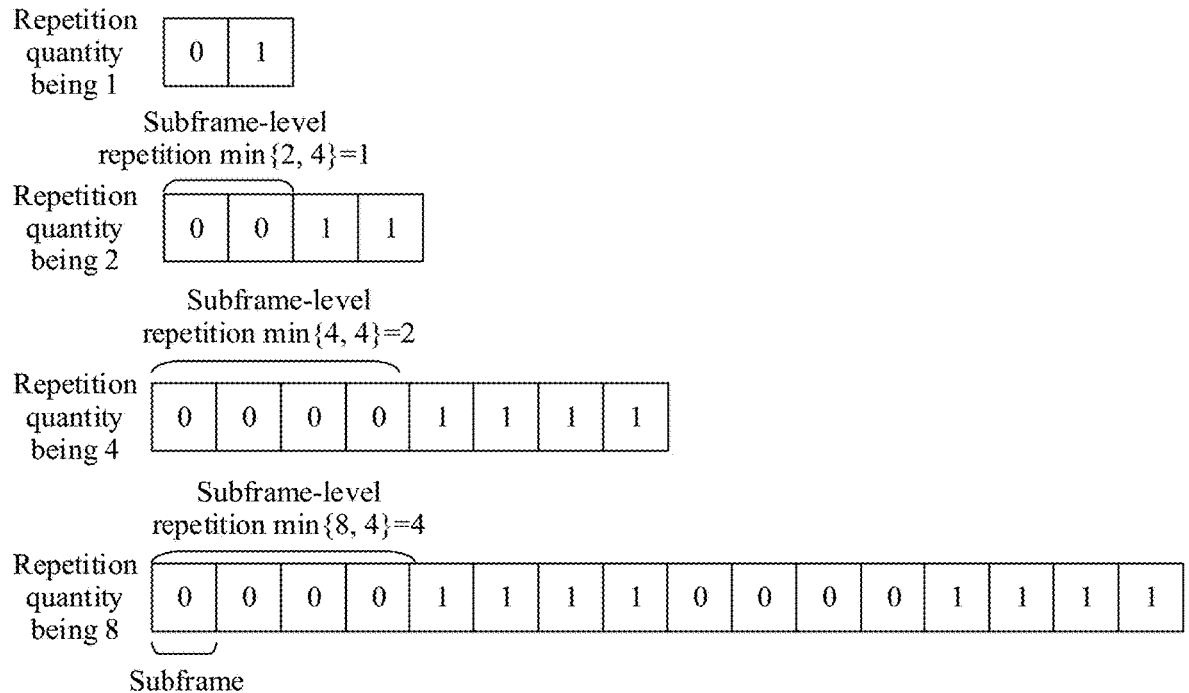

FIG. 1C shows an example. An NPDSCH carrying one TB is mapped to two subframes, a repetition quantity for subframe-level repetition is $\min(M_{rep}^{NPDSCH}, 4)$, and $M_{rep}^{NPDSCH}$ is the repetition quantity. The following figure shows cases in which repetition quantities are 1, 2, 4, and 8.

(9) Interleaved transmission mode

For the interleaved transmission mode, each of N TBs that are scheduled by using DCI has a respective transmission duration, and transmission of each TB cannot be completed within the respective transmission duration. After the transmission duration of each TB elapses, transmission of a next TB starts. After the transmission duration of the last TB elapses, transmission of the first TB to the last TB is restarted based on the respective transmission duration, and this cycle is performed until transmission of all the TBs is completed.

For example, two TBs are scheduled by using the DCI. A TB 1 and a TB 2 have respective transmission durations, and transmission of each TB cannot be completed within the respective transmission duration. The transmission duration of the TB 1 is referred to as a first time granularity, and the transmission duration of the TB 2 is referred to as a second time granularity. For the interleaved transmission mode, transmission of TB 2 is performed after transmission of the TB 1 at the first time granularity is completed, and transmission of TB 1 is performed after transmission of TB 2 at the second time granularity is completed. Then, transmission of TB 2 is performed after transmission of TB 1 at the first time granularity is completed, and transmission of TB 1 Is performed after transmission of TB 2 at the second time granularity is completed. The TB 1 and the TB 2 are sequentially alternately transmitted until transmission of the TB 1 and the TB 2 is completed. The first time granularity and the second time granularity are referred to as interleaving granularities in embodiments of this application, and the first time granularity and the second time granularity may be the same or different.

Figure 1D:
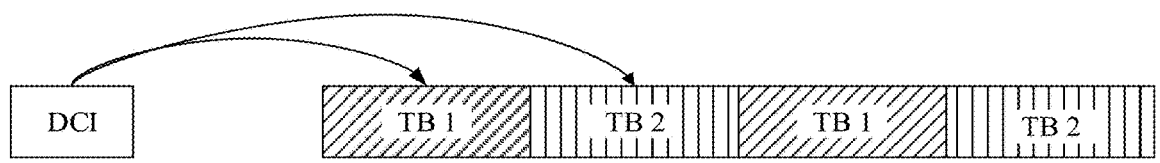
FIG. 1D and FIG. 1E are schematic diagrams of scheduling a plurality of TBs by using DCI according to embodiments of this application.

In an example, when the TB 1 and the TB 2 are scheduled by using the DCI, assuming that the repetition quantity is 2, if interleaved transmission is used for the TB 1 and the TB 2, a possible transmission pattern is shown in FIG. 1D.

(10) Sequential transmission mode

For the sequential transmission mode, after transmission of each of N TBs that are scheduled by using DCI is completed, transmission of a next TB starts, and so on, until transmission of all the TBs is completed.

For example, two TBs are scheduled by using the DCI. A TB 1 is first transmitted, and a TB 2 is transmitted after transmission of the TB 1 is completed.

Figure 1E:
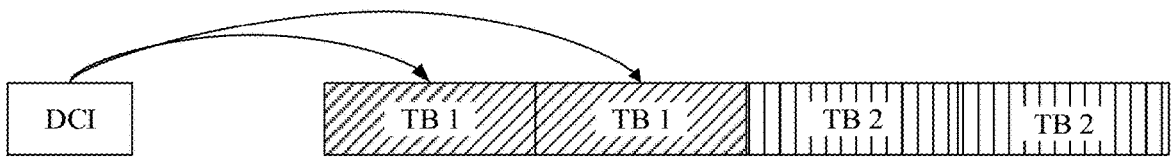

In an example, when the TB 1 and the TB 2 are scheduled by using the DCI, assuming that the repetition quantity is 2, if sequential transmission is used for the TB 1 and the TB 2, a possible transmission pattern is shown in FIG. 1E.

(11) The terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, including at least one means including one, two, or more, and which are included is not limited, for example, including at least one of A, B, and C. In this case, A, B, C, A and B, A and C, B and C, or A and B and C may be included. The term "and/or" describes an association relationship between associated objects and represents that three relationships may exist. For example, A and/or B may represent the following three cases: Only A exists, both A and B exist, and only B exists. In addition, the character "/" usually indicates an "or" relationship between the associated objects unless otherwise stated.

Unless otherwise stated, ordinal numbers such as "first" and "second" in embodiments of this application are used to distinguish between a plurality of objects, and are not intended to limit a sequence, a time sequence, priorities, or importance of the plurality of objects.

Embodiments of this application may be applied to various communication systems such as an NB-IoT system, an IoT system, an MTC system, an eMTC system, an LTE system, an LTE-A system, a new radio (NR) system, or a new communication system emerging in future communication development. A communication method provided in the embodiments of this application may be used, provided that an entity in a communication system uses different spreading sequences at different time points to achieve an objective of interference randomization.

Figure 2:
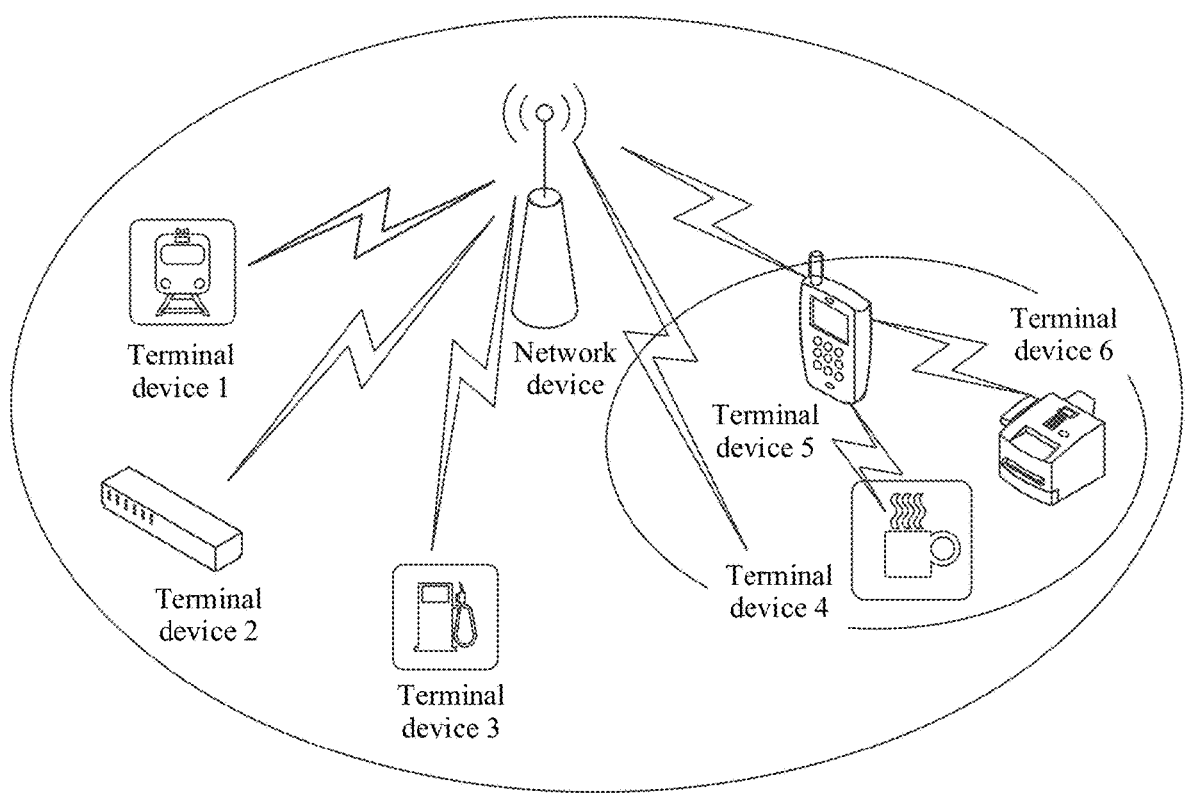
FIG. 2 is a schematic diagram of a communication system to which a communication method is applicable according to an embodiment of this application.

FIG. 2 shows a communication system to which an embodiment of this application is applicable. The communication system shown in FIG. 2 includes a network device and six terminal devices. Any one of a terminal device 1 to a terminal device 6 may send uplink data to the network device. In addition, the terminal device 4 to the terminal device 6 may also form a communication subsystem. The network device may send downlink information to the terminal device 1, the terminal device 2, the terminal device 3, and the terminal device 5. The terminal device 5 may send the downlink information to the terminal device 4 and the terminal device 6 based on a device-to-device (D2D) technology. FIG. 2 is merely a schematic diagram. A type of the communication system, a quantity and a type of devices included in the communication system, and the like are not limited.

A network architecture and a service scenario described in embodiments of this application are intended to describe the technical solutions in the embodiments of this application more clearly, and do not constitute any limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

A network architecture and a service scenario described in embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In the embodiments of this application, an NB-IoT network scenario in a wireless communication network is used as an example to describe some scenarios. It should be noted that the solutions in the embodiments of this application may be further applied to another wireless communication network, and a corresponding name may also be replaced with a name of a corresponding function in the other wireless communication network.

Figure 3:
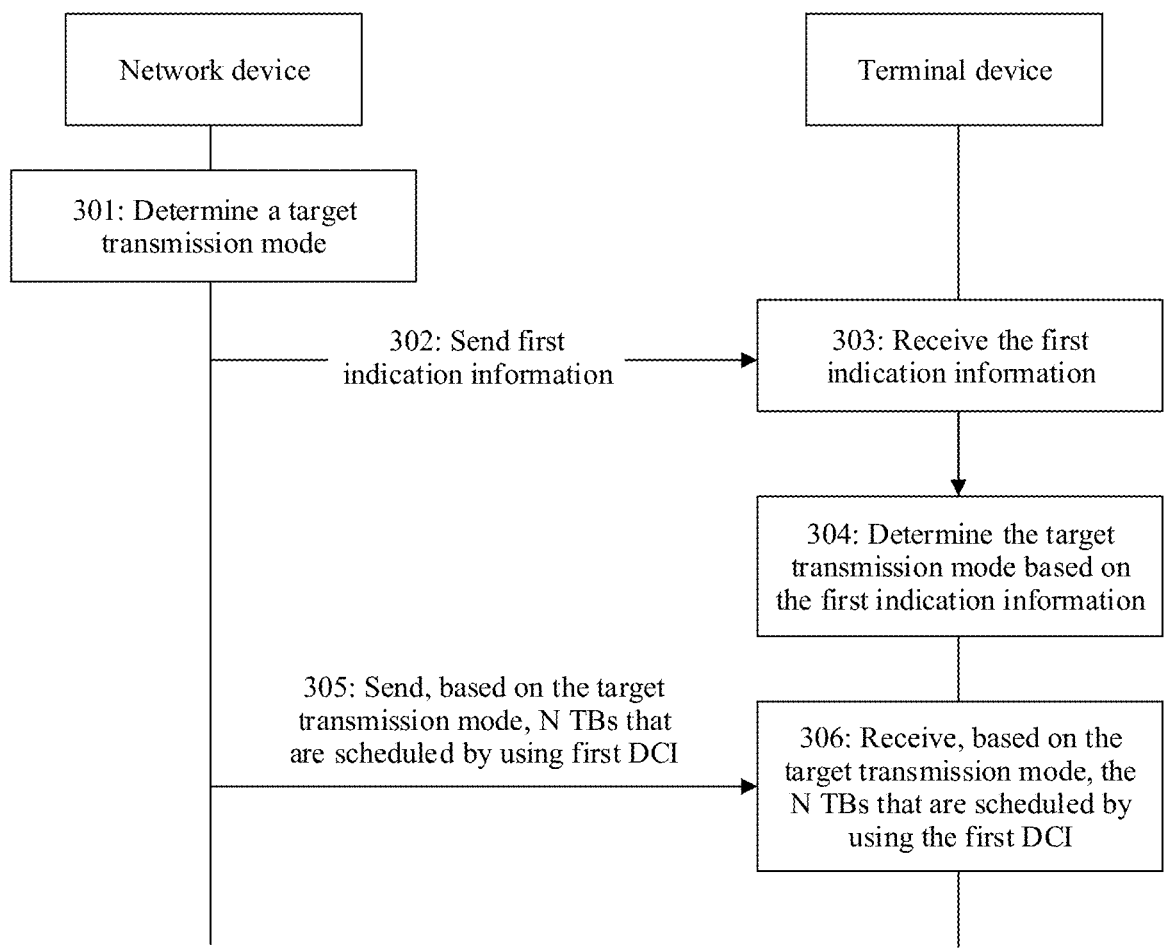
FIG. 3 is a schematic diagram of a first communication method according to an embodiment of this application.

With reference to the foregoing descriptions, FIG. 3 is a schematic flowchart of a first communication method according to an embodiment of this application. Refer to FIG. 3. The method includes the following steps.

Step 301: A network device determines a target transmission mode.

The target transmission mode may be an interleaved transmission mode, or may be a sequential transmission mode. The network device may determine the target transmission mode based on at least one of capability information of a terminal device, channel state information reported by the terminal device, uplink quality, downlink quality, a network coverage status, a network resource occupation status, a network load status, and transmission duration. For example, when network coverage is good and the transmission duration is short, the target transmission mode may be the sequential transmission mode; or when network coverage is poor and the transmission duration is long, the target transmission mode may be the interleaved transmission mode. For another example, when the terminal device has an interleaved transmission capability, the network device may determine that the target transmission mode is the interleaved transmission mode; or when the terminal device does not have an interleaved transmission capability, the network device may determine that the target transmission mode is the sequential transmission mode.

Optionally, before step 301, the method further includes: The network device receives first capability information of the terminal device, where the first capability information is used to indicate whether the terminal device supports interleaved transmission.

Step 302: The network device sends first indication information to the terminal device.

The first indication information is used to indicate the target transmission mode, and first indication information may be carried in a system message, or carried in radio resource control (RRC) signaling, or carried in a media access control (MAC) protocol data unit (PDU), or carried in a MAC control element (CE), or the like. For another example, the first indication information may be carried in DCI.

It should be noted that, when the first indication information may be carried in the DCI, the DCI further carries scheduling information of N transport blocks (TBs). When the first indication information is not carried in the DCI, the network device further sends the DCI to the terminal device. The DCI carries the scheduling information of the N transport blocks (TBs), and N is a positive integer greater than 2.

Step 303: The terminal device receives the first indication information.

Step 304: The terminal device determines a target transmission mode of the N TBs based on the first indication information.

Step 305: The network device sends the N TBs to the terminal device based on the target transmission mode.

Step 306: The terminal device receives the N TBs from the network device based on the target transmission mode.

It may be understood that, in this embodiment of this application, a sequence in which the network device determines and/or sends the first indication information, the DCI, and a plurality of TBs that are scheduled by using the DCI is not limited.

In a possible embodiment, the first indication information is not carried in DCI, for example, but is carried in a system message, RRC signaling, or a MAC CE, and the first indication information is used to indicate that the target transmission mode of the terminal device is the sequential transmission mode or the interleaved transmission mode. When the network device determines that the target transmission mode is the interleaved transmission mode, the first indication information is used to indicate that the target transmission mode is the interleaved transmission mode, and after receiving the first indication information, the terminal device determines, based on the first indication information, that the target transmission mode is the interleaved transmission mode. When the network device determines that the target transmission mode is the sequential transmission mode, after receiving the first indication information, the terminal device determines, based on the first indication information, that the target transmission mode is the sequential transmission mode. For example, the first indication information includes a first parameter, a value of the first parameter may include a first value or a second value, the first value indicates that the target transmission mode is the sequential transmission mode, and the second value indicates that the target transmission mode is the interleaved transmission mode. For example, the first value may be 1, and the second value may be 0. Alternatively, the first value may be 0, and the second value may be 1.

For another example, the first indication information includes a first parameter. When the first parameter is configured, it indicates that the target transmission mode is the interleaved transmission mode; or when the first parameter is not configured, it indicates that the target transmission mode is the sequential transmission mode.

In a possible embodiment, the first indication information is not carried in the DCI, for example, but is carried in a system message, RRC signaling, or a MAC CE, and the first indication information includes a maximum repetition quantity $R_{max}$ of a downlink control channel. When the network device determines that the target transmission mode is the interleaved transmission mode, $R_{max}$ in the first indication information is greater than or equal to a first threshold, and after receiving the first indication information from a network device side, the terminal device determines that the target transmission mode is the interleaved transmission mode. When the network device determines that the target transmission mode is the sequential transmission mode, $R_{max}$ in the first indication information is less than a first threshold, and after receiving the first indication information from a network device side, the terminal device determines that the target transmission mode is the interleaved transmission mode.

In a possible embodiment, the first indication information is not carried in the DCI, for example, but is carried in a system message, RRC signaling, or a MAC CE, and the first indication information includes a maximum repetition quantity $R_{max}$ of downlink control channel. When the network device determines that the target transmission mode is the interleaved transmission mode, $R_{max}$ in the first indication information is greater than a first threshold, and after receiving the first indication information from a network device side, the terminal device determines that the target transmission mode is the interleaved transmission mode. When the network device determines that the target transmission mode is the sequential transmission mode, $R_{max}$ in the first indication information is less than or equal to a first threshold, and after receiving the first indication information from a network device side, the terminal device determines that the target transmission mode is the interleaved transmission mode. It should be noted that, the first threshold may be a preset value or configured by the network device side.

In a possible embodiment, the first indication information is carried in the DCI, the first indication information includes a modulation and coding scheme (modulation and coding scheme, MCS) of $TB_k$, and $TB_k$ is one of the N TBs. A value of K is related to numbers of the N TBs. Assuming that the numbers of the N TBs are 1 to N, $1 \leq K \leq N$. For another example, if the numbers of the N TBs are 0 to N−1, $0 \leq K \leq N-1$. In this embodiment of this application, the target transmission mode is implicitly indicated by using the maximum repetition quantity of the downlink control channel. Compared with specifying the target transmission mode by using explicit signaling, this can reduce signaling overheads. When $R_{max}$ is greater than or equal to the first threshold, it indicates that downlink coverage is poor or downlink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $R_{max}$ is less than the first threshold, it indicates that downlink coverage is good or downlink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

The DCI may include at least one of the following: resource allocation indication information, a modulation and coding scheme (MCS), repetition quantity indication information, indication information of a quantity of scheduled TBs, subcarrier indication information, and the like.

The resource allocation indication information is used to indicate allocation of a scheduling resource, for example, allocation of a time domain resource. In this specification, in an embodiment corresponding to a downlink, the resource allocation indication information is used to determine a quantity $N_{SF}$ of subframes to which a downlink data channel carrying a TB is mapped. In an embodiment corresponding to an uplink, the resource allocation indication information is used to indicate a quantity $N_{RU}$ of RUs to which an uplink data channel carrying a TB is mapped. The MCS is used to indicate a modulation order. The repetition quantity indication information is used to indicate a repetition quantity used for TB transmission. In this specification, in the embodiment corresponding to the downlink, the repetition quantity is represented by $M_{rep}^{NPDSCH}$, and in the embodiment corresponding to the uplink, the repetition quantity is represented by $M_{rep}^{NPDSCH}$. The indication information of the quantity of scheduled TBs is used to indicate a quantity of TBs that are scheduled by using the DCI. The subcarrier indication information is used to determine a quantity $N_{sc}^{RU}$ of consecutive subcarriers occupied by the TB in one RU. Table 4 shows an example of the DCI.

TABLE 4

| Information (Information) | Size (Size [bits]) |
|---|---|
| Resource allocation indication information | 3 |
| MCS | 4 |
| Repetition quantity indication information | 4 |
| Indication information of a quantity of scheduled TBs | 2 |
| Subcarrier indication information | 2 |

It should be noted that, for a plurality of TBs that are scheduled by using the DCI, indication information in the DCI may be the same. In this way, signaling overheads of the DCI can be reduced. For example, if two TBs are scheduled by using the DCI, and the MCS indicated in the DCI is 4, MCSs of the two TBs are the same, and are both 4. For another example, if two TBs are scheduled by using the DCI, and it is determined, based on the repetition quantity indication information in the DCI, that the repetition quantity is 8, repetition quantities of the two TBs are the same, and are both 8.

When the network device determines that the target transmission mode is the interleaved transmission mode, the MCS in the first indication information is less than or equal to a third threshold, and after receiving the first indication information from the network device side, the terminal device determines that the target transmission mode is the interleaved transmission mode. When the network device determines that the target transmission mode is the sequential transmission mode, the MCS in the first indication information is greater than a third threshold, and after receiving the first indication information from the network device side, the terminal device determines that the target transmission mode is the sequential transmission mode. In other words, when the network device determines that the target transmission mode is the interleaved transmission mode, the MCS in the first indication information is less than a third threshold, and after receiving the first indication information from the network device side, the terminal device determines that the target transmission mode is the interleaved transmission mode. When the network device determines that the target transmission mode is the sequential transmission mode, the MCS in the first indication information is greater than or equal to a third threshold, and after receiving the first indication information from the network device side, the terminal device determines that the target transmission mode is the sequential transmission mode. In this embodiment of this application, the target transmission mode is implicitly indicated by using the MCS in the DCI. Compared with specifying the target transmission mode by using explicit signaling, this can reduce signaling overheads. When the MCS is less than or equal to the third threshold, it indicates that downlink coverage is poor or downlink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When the MCS is greater than the third threshold, it indicates that downlink coverage is good or downlink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

For example, usually, when a network coverage condition is good, the network device configures a high MCS value, to increase a rate and reduce a delay. When a network coverage condition is poor, the network device configures a low MCS value and uses a low bit rate with a large proportion of redundant bits, to improve data transmission reliability. Therefore, after receiving the first indication information, the terminal device may compare the MCS with the third threshold, and determine, based on a comparison result, whether to use interleaved transmission. For example, for an in-band (in-band) deployment mode, when the MCS is less than or equal to 4, the target transmission mode is the interleaved transmission mode; or when the MCS is greater than 4, the target transmission mode is the sequential transmission mode. For another deployment mode, when the MCS is less than or equal to 6, the target transmission mode is the interleaved transmission mode; or when the MCS is greater than 6, the target transmission mode is the sequential transmission mode.

It should be noted that, the third threshold may be a preset value or configured by the network device side. A same third threshold or different third thresholds may be used in different deployment modes. Currently, an NB-IoT system includes three deployment modes: an independent deployment mode, a guard band deployment mode, and an in-band deployment mode. The in-band deployment mode means that the NB-IoT system is deployed in a transmission band of another communication system. The in-band deployment mode may be classified, depending on whether physical cell identifiers (PCIs) of the two systems are the same, into in-band same PCI or in-band different PCI. For example, if the NB-IoT system is deployed in a guard band of an LTE system, the in-band deployment mode may be classified, depending on whether the PCI of the NB-IoT system is the same as a PCI of the LTE system, into in-band same PCI or in-band different PCI. The terminal device may obtain deployment mode information by receiving a system message sent by the network device.

In a possible embodiment, the first indication information is carried in the DCI, and the first indication information includes the repetition quantity indication information and the resource allocation indication information in Table 4. For example, a second parameter in the DCI is the repetition quantity indication information. If a value of the second parameter is 0, it indicates that the repetition quantity is 2; if a value of the second parameter is 1, it indicates that the repetition quantity is 4; or if a value of the second parameter is 2, it indicates that the repetition quantity is 8.

When the network device determines that the target transmission mode is the interleaved transmission mode, when $M_{rep}^{NPDSCH} \times N_{SF}$ is greater than or equal to a second threshold, or when $M_{rep}^{NPDSCH}$ is greater than or equal to a threshold A, or when $N_{SF}$ is greater than or equal to a threshold B, after the terminal device receives the first indication information from the network device side, the terminal device determines that the target transmission mode is the interleaved transmission mode.

When the network device determines that the target transmission mode is the sequential transmission mode, when $M_{rep}^{NPDSCH} \times N_{SF}$ is less than a second threshold, or when $M_{rep}^{NPDSCH}$ is less than a threshold A, or when $N_{SF}$ is less than a threshold B, after the terminal device receives the first indication information from the network device side, the terminal device determines that the target transmission mode is the sequential transmission mode. In this embodiment of this application, the target transmission mode is implicitly indicated by using the scheduling information, the repetition quantity indication information, and the resource allocation indication information in the DCI. Compared with specifying the target transmission mode by using explicit signaling, this can reduce signaling overheads. When $M_{rep}^{NPDSCH} \times N_{SF}$ is greater than or equal to the second threshold, it indicates that transmission duration is long, and the terminal device determines that the target transmission mode is the interleaved transmission mode. In this case, a high time diversity gain can be obtained by using the interleaved transmission mode. When $M_{rep}^{NPDSCH} \times N_{SF}$ is less than the second threshold, it indicates that transmission duration is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In this embodiment of this application, when $M_{rep}^{NPUSCH} \times N_{SF}$ is greater than or equal to the second threshold, it indicates that the transmission duration is long, and therefore, the terminal device determines that the target transmission mode is the interleaved transmission mode; or when $M_{rep}^{NPUSCH} \times N_{SF}$ is less than the second threshold, it indicates that the transmission duration is short, and the terminal device determines that the target transmission mode is the sequential transmission mode, to improve data transmission reliability. In addition, the first indication information is carried in the DCI, thereby reducing signaling overheads. It should be noted that, based on different threshold values, "greater than or equal to" in the foregoing embodiment may be replaced with "greater than", and "less than" may be replaced with "less than or equal to". Details are not described herein.

In a possible embodiment, the first indication information may include second indication information and third indication information; the second indication information is carried in the DCI; the second indication information includes the repetition quantity indication information and the resource allocation indication information in Table 4; and the third indication information is used to indicate that the target transmission mode of the terminal device is the interleaved transmission mode or the sequential transmission mode. That is, in this embodiment of this application, step 302 in FIG. 3 may be replaced with the following: The network device sends the DCI to the terminal device, where the DCI includes the second indication information, and the network device sends the third indication information to the terminal device. In this embodiment, when the terminal device first receives the third indication information and does not receive the second indication information, the terminal device first determines, based on the third indication information, a transmission mode to be used. After receiving the second indication information, the terminal device determines, based on the second indication information, a transmission mode to be finally used. Specifically, there are the following determining methods.

Method 1: When the third indication information indicates that the target transmission mode is the interleaved transmission mode, and $M_{rep}^{NPDSCH}$ and $N_{SF}$ that are determined based on the second indication information satisfy that $M_{rep}^{NPDSCH} \times N_{SF}$ is greater than or equal to the second threshold, the terminal device determines that the target transmission mode is the interleaved transmission mode.

Method 2: When the third indication information indicates that the target transmission mode is the interleaved transmission mode, the terminal device determines that the target transmission mode is the interleaved transmission mode; and then when $M_{rep}^{NPDSCH}$ and $N_{SF}$ that are determined based on the second indication information satisfy that $M_{rep}^{NPDSCH} \times N_{SF}$ is less than the second threshold, the terminal device determines that the target transmission mode is the sequential transmission mode.

Method 3: When the third indication information indicates that the target transmission mode is the sequential transmission mode, the terminal device determines that the target transmission mode is the sequential transmission mode.

In this embodiment of this application, when the terminal device transmits a plurality of TBs, in addition to determining, based on the third indication information, whether to use interleaved transmission, the terminal device further determines, based on the second indication information in the currently received DCI, whether to use the interleaved transmission mode. Flexibility of indicating the target transmission mode can be improved by using the DCI. In addition, the second indication information is implicitly indicated by using scheduling information, the repetition quantity indication information, and the resource allocation indication information in the DCI. Compared with using explicit signaling in the DCI, this can reduce signaling overheads.

In this embodiment of this application, a terminal device side is likely to first receive, from the network device side, the third indication information indicating that the target transmission mode is the interleaved transmission mode. When transmitting the TB, the terminal device still needs to determine, based on the second indication information in the currently received DCI, whether to use the interleaved transmission mode. If the terminal device determines, based on the second indication information in the currently received DCI, that the target transmission mode is the sequential transmission mode, the terminal device determines that the target transmission mode is the sequential transmission mode, to improve data transmission reliability. It should be noted that, based on different threshold values, "greater than or equal to" in the foregoing embodiment may be replaced with "greater than", and "less than" may be replaced with "less than or equal to". Details are not described herein.

In a possible embodiment, when the target transmission mode is the interleaved transmission mode, an interleaving granularity of the N TBs is $p \times N_{SF} \times \min(M_{rep}^{NPUSCH}, 4)$ subframes, or an interleaving granularity of the N TBs is $p \times \min(M_{rep}^{NPUSCH}, 4)$ subframes, where p is a positive integer greater than or equal to 1.

Figure 4:
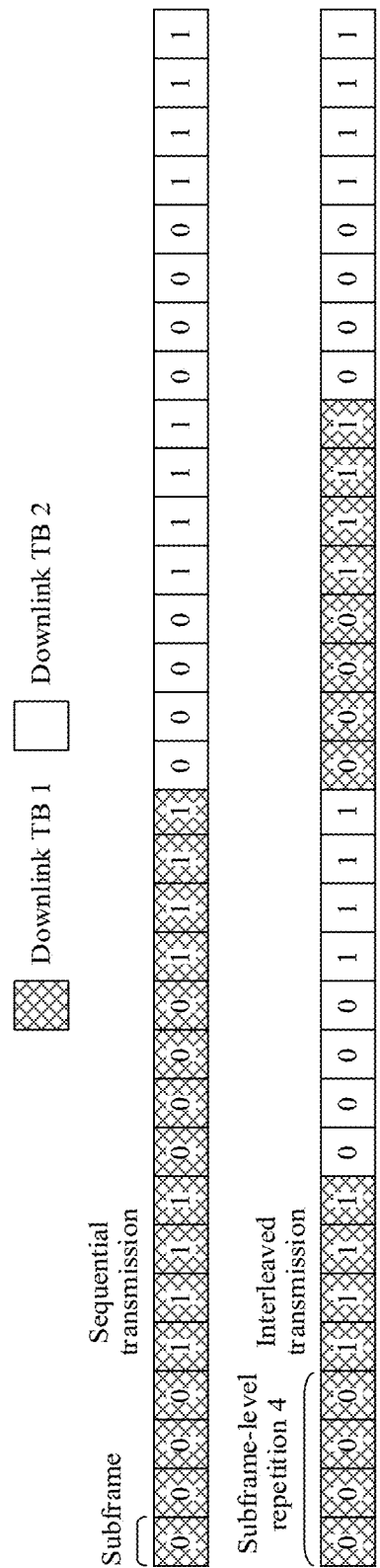
FIG. 4 is a schematic diagram of sequential transmission and interleaved transmission in a downlink transmission process according to an embodiment of this application.

FIG. 4 is a schematic diagram of sequential transmission and interleaved transmission in a downlink transmission process. In the figure, $N_{SF}$ is equal to 2, and $M_{rep}^{NPDSCH}$ is equal to 8. Two TBs, namely, a TB 1 (where the TB 1 is indicated by a grid in the figure) and a TB 2, are scheduled by using the DCI. It can be learned from FIG. 4 that, an interleaving granularity of the TB 1 and the TB 2 is four subframes.

In this embodiment of this application, when the interleaved transmission mode is used for the plurality of TBs, the interleaving granularity is $p \times N_{SF} \times \min(M_{rep}^{NPUSCH}, 4)$ subframes or $p \times \min(M_{rep}^{NPUSCH}, 4)$ subframes, so that the time diversity gain can be maximized. Moreover, a subframe-level repetition structure may be reserved for each TB, and symbol-level combination may be performed on $\min(M_{rep}^{NPUSCH}, 4)$ repeated subframes to ensure demodulation performance. In addition, a frequency offset may be estimated by performing a differential operation on every two subframes in the $\min(M_{rep}^{NPDSCH}, 4)$ repeated subframes, and a data symbol in one subframe and a symbol in which a reference signal is located are used to estimate a frequency offset. Compared with estimating a frequency offset by using only the symbol in which the reference signal is located, this can improve frequency offset tracking performance.

Figure 5:
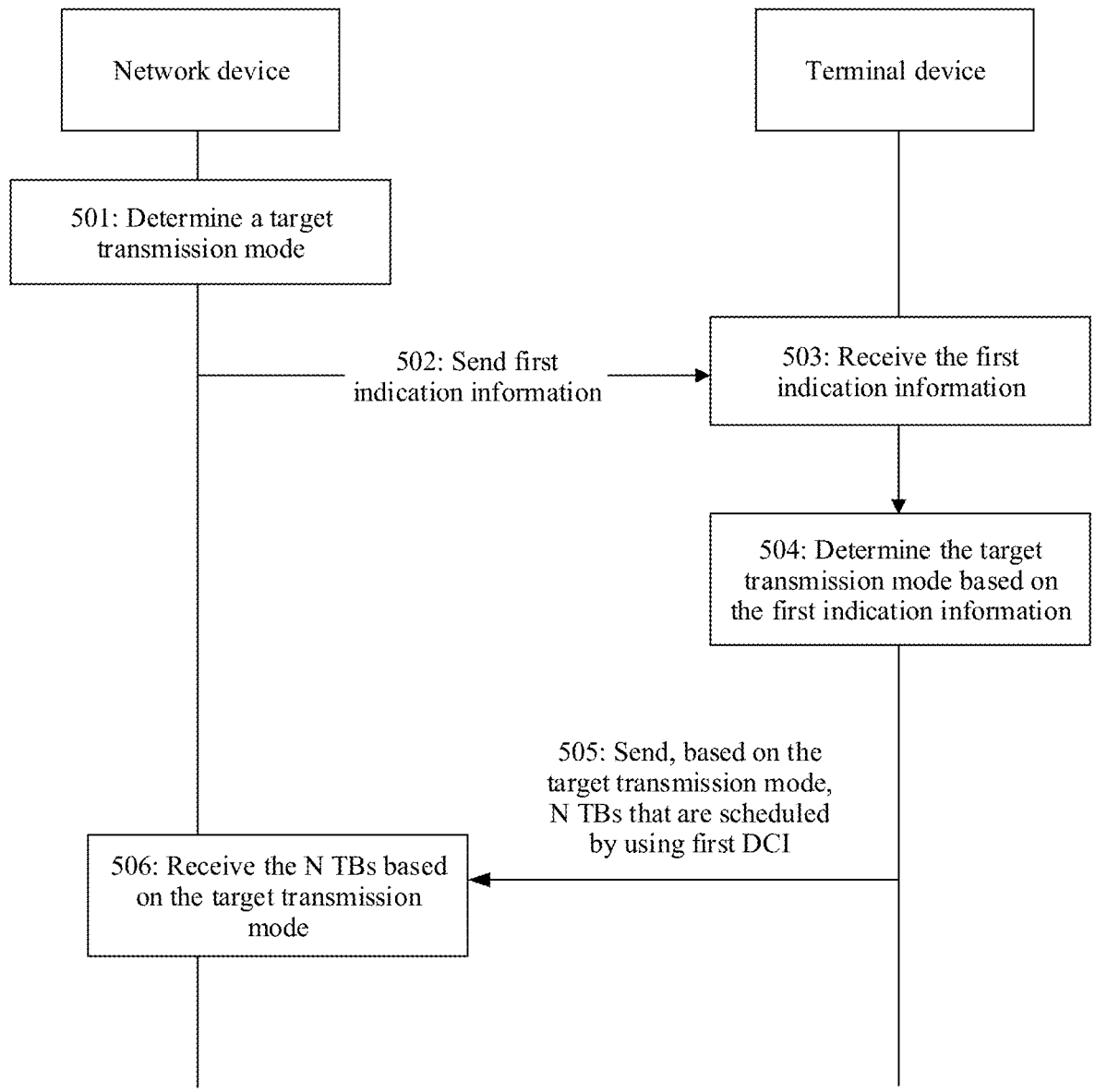
FIG. 5 is a schematic diagram of a second communication method according to an embodiment of this application.

FIG. 5 is a flowchart of a second communication method according to an embodiment of this application. Refer to FIG. 5. The method includes the following steps.

Step 501: A network device determines a target transmission mode.

The target transmission mode may be an interleaved transmission mode, or may be a sequential transmission mode. The network device may determine the target transmission mode based on at least one of capability information of a terminal device, channel state information reported by the terminal device, uplink quality, downlink quality, a network coverage status, a network resource occupation status, a network load status, and transmission duration. For example, when network coverage is good and the transmission duration is short, the target transmission mode may be the sequential transmission mode; or when network coverage is poor and the transmission duration is long, the target transmission mode may be the interleaved transmission mode. For another example, when the terminal device has an interleaved transmission capability, the network device may determine that the target transmission mode is the interleaved transmission mode; or when the terminal device does not have an interleaved transmission capability, the network device may determine that the target transmission mode is the sequential transmission mode.

Optionally, before step 501, the method further includes: The network device receives first capability information of the terminal device, where the first capability information is used to indicate whether the terminal device supports interleaved transmission.

Step 502: The network device sends first indication information to the terminal device.

The first indication information is used to indicate the target transmission mode, and first indication information may be carried in a system message, or carried in radio resource control (RRC) signaling, or carried in a media access control (MAC) protocol data unit (PDU), or carried in a media access control (MAC) control element (CE), or the like. For another example, the first indication information may be carried in DCI.

It should be noted that, when the first indication information may be carried in the DCI, the DCI further carries scheduling information of N transport blocks (TBs). When the first indication information is not carried in the DCI, the network device further sends the DCI to the terminal device. The DCI carries the scheduling information of the N transport blocks (transport blocks, TBs), and N is a positive integer greater than 2.

Step 503: The terminal device receives the first indication information.

Step 504: The terminal device determines a target transmission mode of the N TBs based on the first indication information.

Step 505: The terminal device sends the N TBs to the network device based on the target transmission mode.

Step 506: The network device receives the N TBs from the terminal device based on the target transmission mode.

It may be understood that, in this embodiment of this application, a sequence between receiving, by the network device, a plurality of TBs that are scheduled by using the DCI and determining and/or sending, by the network device, the first indication information and the DCI is not limited.

In a possible embodiment, the first indication information is not carried in DCI, for example, but is carried in a system message, RRC signaling, or a MAC CE, and the first indication information is used to indicate that the target transmission mode of the terminal device is the sequential transmission mode or the interleaved transmission mode. When the network device determines that the target transmission mode is the interleaved transmission mode, the first indication information is used to indicate that the target transmission mode is the interleaved transmission mode, and after receiving the first indication information, the terminal device determines, based on the first indication information, that the target transmission mode is the interleaved transmission mode. When the network device determines that the target transmission mode is the sequential transmission mode, after receiving the first indication information, the terminal device indicates, based on the first indication information, that the target transmission mode is the sequential transmission mode. For example, the first indication information includes a first parameter, a value of the first parameter may include a first value or a second value, the first value indicates that the target transmission mode is the sequential transmission mode, and the second value indicates that the target transmission mode is the interleaved transmission mode. For example, a value of the first value may be 1, and a value of the second value may be 0. Alternatively, a value of the first value may be 0, and a value of the second value may be 1.

For another example, the first indication information includes a first parameter. When the first parameter is configured, it indicates that the target transmission mode is the interleaved transmission mode; or when the first parameter is not configured, it indicates that the target transmission mode is the sequential transmission mode.

In a possible embodiment, the first indication information is carried in the DCI, the first indication information includes a modulation and coding scheme (MCS) of $TB_k$, and $TB_k$ is one of the N TBs. A value of K is related to numbers of the N TBs. Assuming that the numbers of the N TBs are 1 to N, $1 \le k \le N$. For another example, if the numbers of the N TBs are 0 to N−1, $0 \le k \le N-1$.

The DCI may include at least one of the following: resource allocation indication information, a modulation and coding scheme (MCS), repetition quantity indication information, indication information of a quantity of scheduled TBs, subcarrier indication information, and the like.

The resource allocation indication information is used to indicate allocation of a scheduling resource, for example, allocation of a time domain resource. In this specification, in an embodiment corresponding to a downlink, the resource allocation indication information is used to determine a quantity $N_{SF}$ of subframes to which a downlink data channel carrying a TB is mapped. In an embodiment corresponding to an uplink, the resource allocation indication information is used to indicate a quantity $N_{RU}$ of RUs to which an uplink data channel carrying a TB is mapped. The MCS is used to indicate a modulation order. The repetition quantity indication information is used to indicate a repetition quantity used for TB transmission. In this specification, in the embodiment corresponding to the downlink, the repetition quantity is represented by $M_{rep}^{NPDSCH}$, and in the embodiment corresponding to the uplink, the repetition quantity is represented by $M_{rep}^{NPUSCH}$. The indication information of the quantity of scheduled TBs is used to indicate a quantity of TBs that are scheduled by using the DCI. The subcarrier indication information is used to determine a quantity $N_{sc}^{RU}$ of consecutive subcarriers occupied by the TB in one RU.

It should be noted that, for a plurality of TBs that are scheduled by using the DCI, indication information in the DCI may be the same. In this way, signaling overheads of the DCI can be reduced. For example, if two TBs are scheduled by using the DCI, and the MCS indicated in the DCI is 6, MCSs of the two TBs are the same, and are both 6. For another example, if two TBs are scheduled by using the DCI, and it is determined, based on the repetition quantity indication information in the DCI, that the repetition quantity is 16, repetition quantities of the two TBs are the same, and are both 16.

In a possible embodiment, the first indication information is carried in the DCI, and the first indication information includes an MCS of the TB. For example, usually, when a network coverage condition is good, the network device configures a high MCS value, to increase a rate and reduce a delay. When a network coverage condition is poor, the network device configures a low MCS value and uses a low bit rate with a large proportion of redundant bits, to improve data transmission reliability. Therefore, after receiving the first indication information, the terminal device may compare the MCS with a fourth threshold, and determine, based on a comparison result, whether the target transmission mode is the interleaved transmission mode. It should be noted that, the fourth threshold may be a preset value or configured by a network device side. For example, for single-tone, when the MCS is less than or equal to 4, it is determined that the target transmission mode is the interleaved transmission mode; otherwise, the target transmission mode is the sequential transmission mode. For multi-tone, when the MCS is less than or equal to 6, it is determined that the target transmission mode is the interleaved transmission mode; otherwise, the target transmission mode is the sequential transmission mode. Specifically, there are the following two cases.

Case 1

When $N_{sc}^{RU}$ is L, for example, when L is 1 (that is, for single-tone), when the network device determines that the target transmission mode is the interleaved transmission mode, the MCS in the first indication information is less than or equal to the fourth threshold, and after receiving the first indication information from the network device, the terminal device determines that the target transmission mode is the interleaved transmission mode; or when the network device determines that the target transmission mode is the sequential transmission mode, the MCS in the first indication information is greater than the fourth threshold, and after receiving the first indication information from the network device, the terminal device determines that the target transmission mode is the sequential transmission mode.

Case 2

When $N_{sc}^{RU}$ is not L, for example, when L is 3, 6, or 12 (that is, for multi-tone), when the network device determines that the target transmission mode is the interleaved transmission mode, the MCS in the first indication information is less than or equal to a fifth threshold, and after receiving the first indication information from the network device, the terminal device determines that the target transmission mode is the interleaved transmission mode; or when the network device determines that the target transmission mode is the sequential transmission mode, the MCS in the first indication information is greater than a fifth threshold, and after receiving the first indication information from the network device, the terminal device determines that the target transmission mode is the sequential transmission mode.

In this embodiment of this application, the target transmission mode is implicitly indicated by using the MCS in the DCI. Compared with specifying the target transmission mode by using explicit signaling, this can reduce signaling overheads. When the MCS is less than or equal to the fourth threshold or the MCS is less than or equal to the fifth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When the MCS is greater than the fourth threshold or the MCS is greater than the fifth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible embodiment, the first indication information is carried in the DCI, and the first indication information includes the repetition quantity indication information $M_{rep}^{NPUSCH}$ and the resource allocation indication information $N_{RU}$ in Table 4.

When the network device determines that the target transmission mode is the interleaved transmission mode, $M_{rep}^{NPUSCH} \times N_{RU}$ is greater than or equal to a sixth threshold, or $M_{rep}^{NPDSCH}$ is greater than or equal to a threshold C, or $N_{RU}$ is greater than or equal to a threshold D, or $M_{rep}^{NPDSCH} \times N_{RU} \times N_{slots}^{UL}$ is greater than or equal to a threshold E, where $N_{slots}^{UL}$ is a quantity of consecutive slots in one RU, and after the terminal device receives the first indication information from the network device side, the terminal device determines that the target transmission mode is the interleaved transmission mode.

When the network device determines that the target transmission mode is the sequential transmission mode, $M_{rep}^{NPDSCH} \times N_{RU}$ is less than a sixth threshold, or $M_{rep}^{NPUSCH}$ is less than a threshold C, or $N_{RU}$ is less than a threshold D, or $M_{rep}^{NPUSCH} \times N_{RU} \times N_{slots}^{UL}$ is less than a threshold E, and after the terminal device receives the first indication information from the network device side, the terminal device determines that the target transmission mode is the sequential transmission mode.

In this embodiment of this application, when $M_{rep}^{NPUSCH} \times N_{RU}$ is less than the sixth threshold or $M_{rep}^{NPUSCH} \times N_{RU} \times N_{slot}^{UL}$ is greater than or equal to the threshold E, it indicates that transmission duration is long, and therefore, the terminal device determines that the target transmission mode is the interleaved transmission mode; or when $M_{rep}^{NPDSCH} \times N_{RU}$ is less than the sixth threshold or $M_{rep}^{NPUSCH} \times N_{RU} \times N_{slots}^{UL}$ is less than the threshold E, it indicates that transmission duration is short, and therefore, the terminal device determines that the target transmission mode is the sequential transmission mode, to improve data transmission reliability. In addition, the first indication information is carried in the DCI, thereby reducing signaling overheads. It should be noted that, based on different threshold values, "greater than or equal to" in the foregoing embodiment may be replaced with "greater than", and "less than" may be replaced with "less than or equal to". Details are not described herein.

In this embodiment of this application, the target transmission mode is implicitly indicated by using scheduling information, the repetition quantity indication information, and the resource allocation indication information in the DCI. Compared with specifying the target transmission mode by using explicit signaling, this can reduce signaling overheads. When $M_{rep}^{NPUSCH} \times N_{RU}$ is greater than or equal to the sixth threshold, it indicates that transmission duration is long, and the terminal device determines that the target transmission mode is the interleaved transmission mode. In this case, a high time diversity gain can be obtained by using the interleaved transmission mode. When $M_{rep}^{NPUSCH} \times N_{RU}$ is less than the sixth threshold, it indicates that transmission duration is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In this embodiment of this application, the first indication information is carried in the DCI; the first indication information includes subcarrier indication information; and the subcarrier indication information is used to determine a quantity $N_{sc}^{RU}$ of consecutive subcarriers occupied by $TB_k$ in one RU. When the network device determines that the target transmission mode is the interleaved transmission mode, $N_{sc}^{RU}$ is L, for example, L is 1 (that is, for single-tone), and after the terminal device receives the first indication information from the network device side, the terminal device determines that the target transmission mode is the interleaved transmission mode. When the network device determines that the target transmission mode is the interleaved transmission mode, $N_{sc}^{RU}$ is not L, for example, L is 3, 6, or 12 (that is, for multi-tone).

For example, usually, when a network coverage condition is good, the network device preferentially allocates multi-tone transmission, to increase a rate and reduce a delay. When a network coverage condition is poor, the network device preferentially allocates single-tone transmission, and uplink power is limited, so that a transmission bandwidth is reduced, to increase a power spectral density (PSD), thereby improving data transmission reliability. Therefore, the terminal device may determine, by using a quantity (that is, a value of $N_{sc}^{RU}$) of tones that are scheduled in the first indication information, whether to use interleaved transmission.

In this embodiment of this application, the target transmission mode is implicitly indicated by using scheduling information and the subcarrier indication information in the DCI. Compared with specifying the target transmission mode by using explicit signaling, this can reduce signaling overheads. When $N_{sc}^{RU}$ is less than or equal to L1, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{sc}^{RU}$ is greater than L1, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible embodiment, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When $N_{sc}^{RU}$ is less than or equal to L1, for example, when L1 is 3, and $N_{sc}^{RU} \leq 3$, the terminal device determines that the target transmission mode is the interleaved transmission mode.

When $N_{sc}^{RU}$ is greater than L1, for example, when L1 is 3 and $N_{sc}^{RU} > 3$, the terminal device determines that the target transmission mode is the sequential transmission mode, where L1 is a positive integer, for example, L1 may be 1 or 3.

In a possible embodiment, the first indication information may be carried in the DCI, and the first indication information includes subcarrier indication information $N_{sc}^{RU}$, resource allocation indication information $N_{RU}$, and repetition quantity indication information $M_{rep}^{NPDSCH}$. $N_{sc}^{RU}$ is equal to L, for example, L is 1 (that is, for single-tone).

When a subcarrier spacing is 3.75 kHz, when the network device determines that the target transmission mode is the interleaved transmission mode, $N_{RU}$ is greater than or equal to a seventh threshold, and after receiving the first indication information from the network device side, the terminal device determines that the target transmission mode is the interleaved transmission mode. When a subcarrier spacing is 3.75 kHz, when the network device determines that the target transmission mode is the sequential transmission mode, $N_{RU}$ is less than a seventh threshold, and after receiving the first indication information from the network device side, the terminal device determines that the target transmission mode is the sequential transmission mode.

When a subcarrier spacing is 15 kHz, when the network device determines that the target transmission mode is the interleaved transmission mode, $N_{RU} \times M_{rep}^{NPDSCH}$ is greater than or equal to an eighth threshold, and after receiving the first indication information from the network device side, the terminal device determines that the target transmission mode is the interleaved transmission mode. When a subcarrier spacing is 15 kHz, when the network device determines that the target transmission mode is the sequential transmission mode, $N_{RU} \times M_{rep}^{NPDSCH}$ is less than an eighth threshold, where the eighth threshold is greater than the seventh threshold, and after receiving the first indication information from the network device side, the terminal device determines that the target transmission mode is the sequential transmission mode.

In this embodiment of this application, the target transmission mode is implicitly indicated by using scheduling information, the subcarrier indication information, the resource allocation indication information, and the repetition quantity indication information in the DCI. Compared with specifying the target transmission mode by using explicit signaling, this can reduce signaling overheads. When $N_{RU}$ is greater than or equal to the seventh threshold or $N_{RU} \times M_{rep}^{NPUSCH}$ is greater than or equal to the eighth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{RU}$ is less than the seventh threshold or $N_{RU} \times M_{rep}^{NPUSCH}$ is less than the eighth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In this embodiment of this application, for an uplink single-tone scenario, when a quantity of resource units to which an uplink data channel carrying one TB is mapped is greater than a threshold, the network device indicates that the target transmission mode is the interleaved transmission mode.

In a possible embodiment, the first indication information is carried in the DCI, and the first indication information includes subcarrier indication information $N_{sc}^{RU}$, resource allocation indication information $N_{RU}$, and repetition quantity indication information $M_{rep}^{NPDSCH}$. $N_{sc}^{RU}$ is not equal to L, for example, L is 3, 6, or 12 (that is, for multi-tone). When the network device determines that the target transmission mode is the interleaved transmission mode, $N_{RU} \times M_{rep}^{NPDSCH}$ is greater than or equal to a ninth threshold, and after receiving the first indication information from the network device side, the terminal device determines that the target transmission mode is the interleaved transmission mode. When the network device determines that the target transmission mode is the sequential transmission mode, $N_{RU} \times M_{rep}^{NPDSCH}$ is less than a ninth threshold, and after receiving the first indication information from the network device side, the terminal device determines that the target transmission mode is the sequential transmission mode. The ninth threshold may be equal to the eighth threshold/a, and a value of a is determined based on a quantity of tones that are scheduled by using the DCI.

In this embodiment of this application, for an uplink multi-tone scenario, when a product of a quantity of resource units to which an uplink data channel carrying one TB is mapped and a repetition quantity is greater than the ninth threshold, the network device indicates that the target transmission mode is the interleaved transmission mode.

In this embodiment of this application, the target transmission mode is implicitly indicated by using scheduling information, the subcarrier indication information, the resource allocation indication information, and the repetition quantity indication information in the DCI. Compared with specifying the target transmission mode by using explicit signaling, this can reduce signaling overheads. When $N_{RU} \times M_{rep}^{NPUSCH}$ is greater than or equal to the ninth threshold, it indicates that uplink coverage is poor or uplink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $N_{RU} \times M_{rep}^{NPUSCH}$ is less than the ninth threshold, it indicates that uplink coverage is good or uplink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible embodiment, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{RU}$ of RUs to which an uplink data channel carrying $TB_k$ is mapped; $TB_k$ is one of the N TBs; and the third indication information is used to indicate that the target transmission mode is the interleaved transmission mode or the sequential transmission mode.

For the Network Device:

When the network device determines that the target transmission mode is the interleaved transmission mode, the third indication information is used to indicate that the target transmission mode of the terminal device is the interleaved transmission mode, and $M_{rep}^{NPUSCH}$ and $N_{RU}$ that are determined based on the second indication information satisfy that $M_{rep}^{NPDSCH} \times N_{RU}$ is greater than or equal to a threshold a; or when the network device determines that the target transmission mode is the interleaved transmission mode, the third indication information indicates that the target transmission mode is the interleaved transmission mode, and then when the network device determines that the target transmission mode is the sequential transmission mode, $M_{rep}^{NPUSCH}$ and $N_{RU}$ that are determined based on the second indication information satisfy that $M_{rep}^{NPUSCH} \times N_{RU}$ is less than a threshold a; or when the network device determines that the target transmission mode is the sequential transmission mode, the third indication information indicates that the target transmission mode is the sequential transmission mode.

For the Terminal Device:

When the third indication information indicates that the target transmission mode is the interleaved transmission mode, and $M_{rep}^{NPUSCH}$ and $N_{RU}$ that are determined based on the second indication information satisfy that $M_{rep}^{NPUSCH} \times N_{RU}$ is greater than or equal to a threshold a, the terminal device determines that the target transmission mode is the interleaved transmission mode; or when the third indication information indicates that the target transmission mode is the interleaved transmission mode, and $M_{rep}^{NPUSCH}$ and $N_{RU}$ that are determined based on the second indication information satisfy that $M_{rep}^{NPUSCH} \times N_{RU}$ is less than a threshold a, the terminal device determines that the target transmission mode is the sequential transmission mode; or when the third indication information indicates that the target transmission mode is the sequential transmission mode, the terminal device determines that the target transmission mode is the sequential transmission mode.

In a possible embodiment, when the target transmission mode is the interleaved transmission mode, an interleaving granularity of the N TBs is ε RUs, or an interleaving granularity of the N TBs is $\varepsilon \times N_{RU} \times N_{slots}^{UL}$ slots.

In another possible embodiment, when the target transmission mode is the interleaved transmission mode, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPDSCH}/2 \rceil, 4)$ slots.

In another possible embodiment, when the target transmission mode is the interleaved transmission mode, when $N_{sc}^{RU}$ is L, for example, when L is 1 (that is, for single-tone), an interleaving granularity of the N TBs is ε RUs, or an interleaving granularity of the N TBs is $\varepsilon \times N_{RU} \times N_{slots}^{UL}$ slots. When the target transmission mode is the interleaved transmission mode, when $N_{sc}^{RU}$ is not L, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPDSCH}/2 \rceil, 4)$ slots. ε, p, and L are all positive integers.

In still another possible embodiment, when the target transmission mode is the interleaved transmission mode, when $N_{sc}^{RU}$ is less than or equal to L2, an interleaving granularity of the N TBs is ε RUs, or an interleaving granularity of the N TBs is $\varepsilon \times N_{RU} \times N_{slots}^{UL}$ slots.

When the target transmission mode is the interleaved transmission mode, when $N_{sc}^{RU}$ is greater than L2, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPDSCH}/2 \rceil, 4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, $TB_k$ is one of the N TBs, and ε, p, and L2 are all positive integers.

Figure 6:
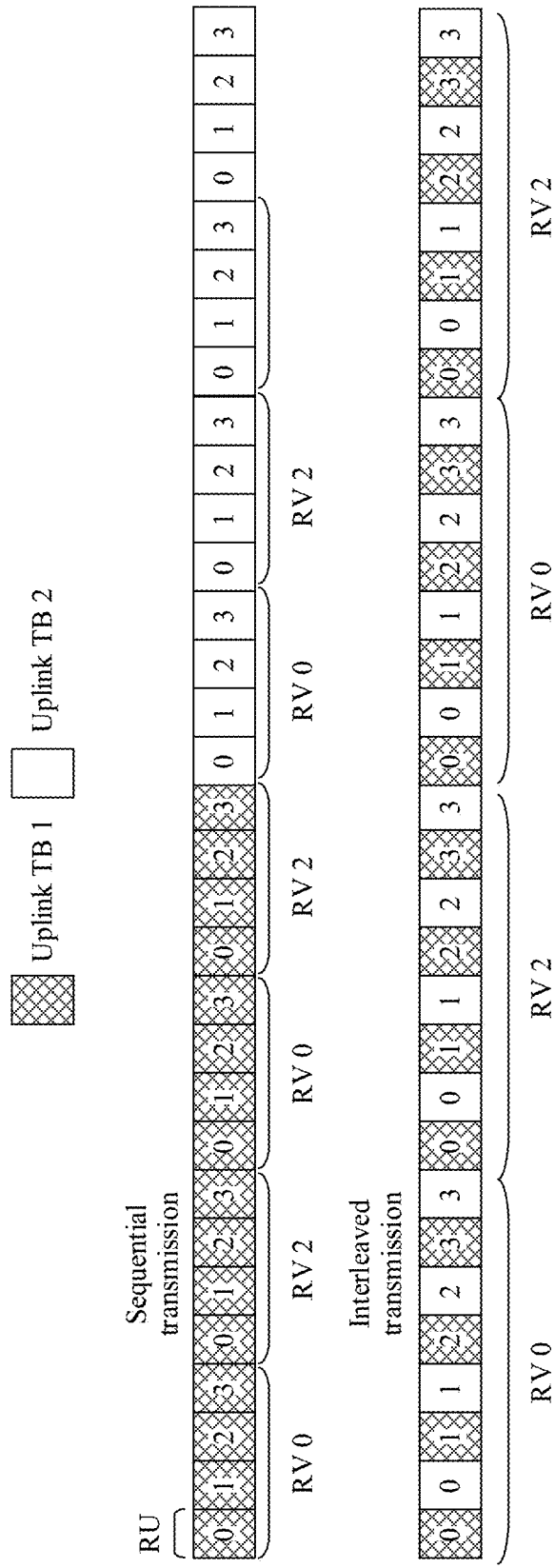
FIG. 6 is a schematic diagram of sequential transmission and interleaved transmission in an uplink transmission process according to an embodiment of this application.

FIG. 6 is a schematic diagram of sequential transmission and interleaved transmission in an uplink transmission process in a single-tone scenario. In FIG. 6, two TBs, namely, a TB 1 (where the TB 1 is indicated by a grid in the figure) and a TB 2, are scheduled by using the DCI. $N_{RU}$ is equal to 4, and $M_{rep}^{NPUSCH}$ is equal to 4. It can be learned from FIG. 6 that, an interleaving granularity of the TB 1 and the TB 2 during interleaved transmission is one RU.

In the embodiments of this application, subframe-level repetition exists in the uplink multi-tone scenario and a downlink multi-tone scenario. This can implement symbol-level combination and improve frequency offset tracking performance. The interleaving granularity is an integer multiple of a quantity of subframe-level repetitions.

Figure 7:
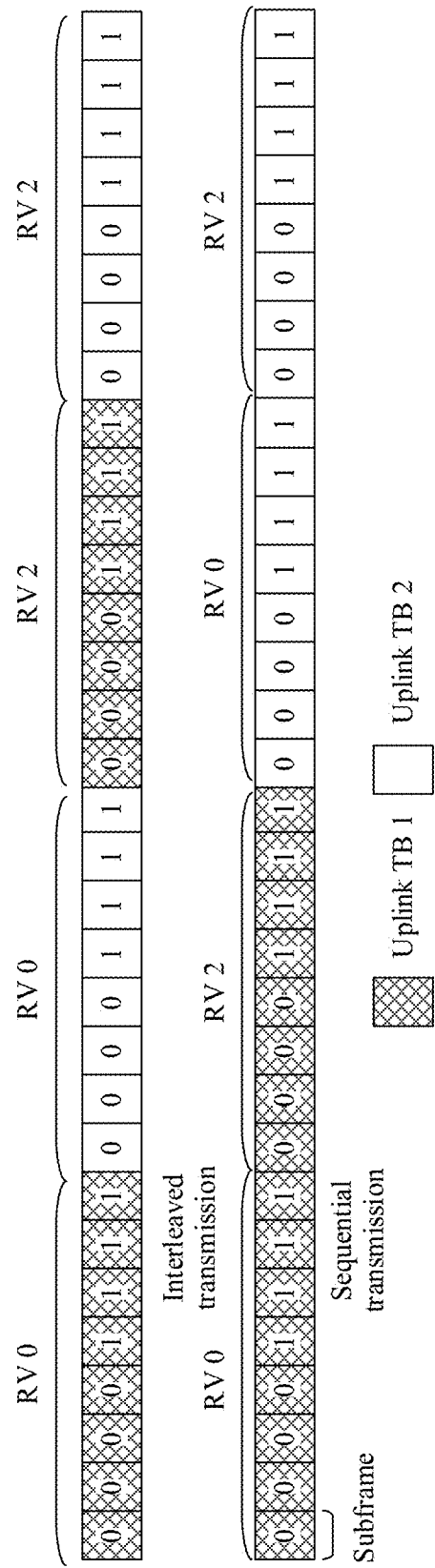
FIG. 7 is another schematic diagram of sequential transmission and interleaved transmission in an uplink transmission process according to an embodiment of this application.

FIG. 7 is a schematic diagram of sequential transmission and interleaved transmission in an uplink transmission process in a multi-tone scenario. In the figure, $N_{SF}$ is equal to 2, $M_{rep}^{NPUSCH}$ is equal to 8, and $N_{sc}^{RU}$ is equal to 12 (that is, 12 tones). Two TBs, namely, a TB 1 (where the TB 1 is indicated by a grid in the figure) and a TB 2, are scheduled by using the DCI. It can be learned from FIG. 7 that, an interleaving granularity of the TB 1 and the TB 2 is $N_{RU} \times N_{slots}^{UL} \times \min(M_{rep}^{NPUSCH}, 4)$ slots.

In the embodiments of this application, for uplink single-tone, the interleaving granularity is an integer multiple of duration of the RU. This maximizes a time diversity gain without affecting inter-cell interference randomization performance. For uplink multi-tone and the downlink, the interleaving granularity is an integer multiple of a quantity of subframe-level repetitions. This maximizes a time diversity gain without affecting frequency offset tracking performance.

Figure 8:
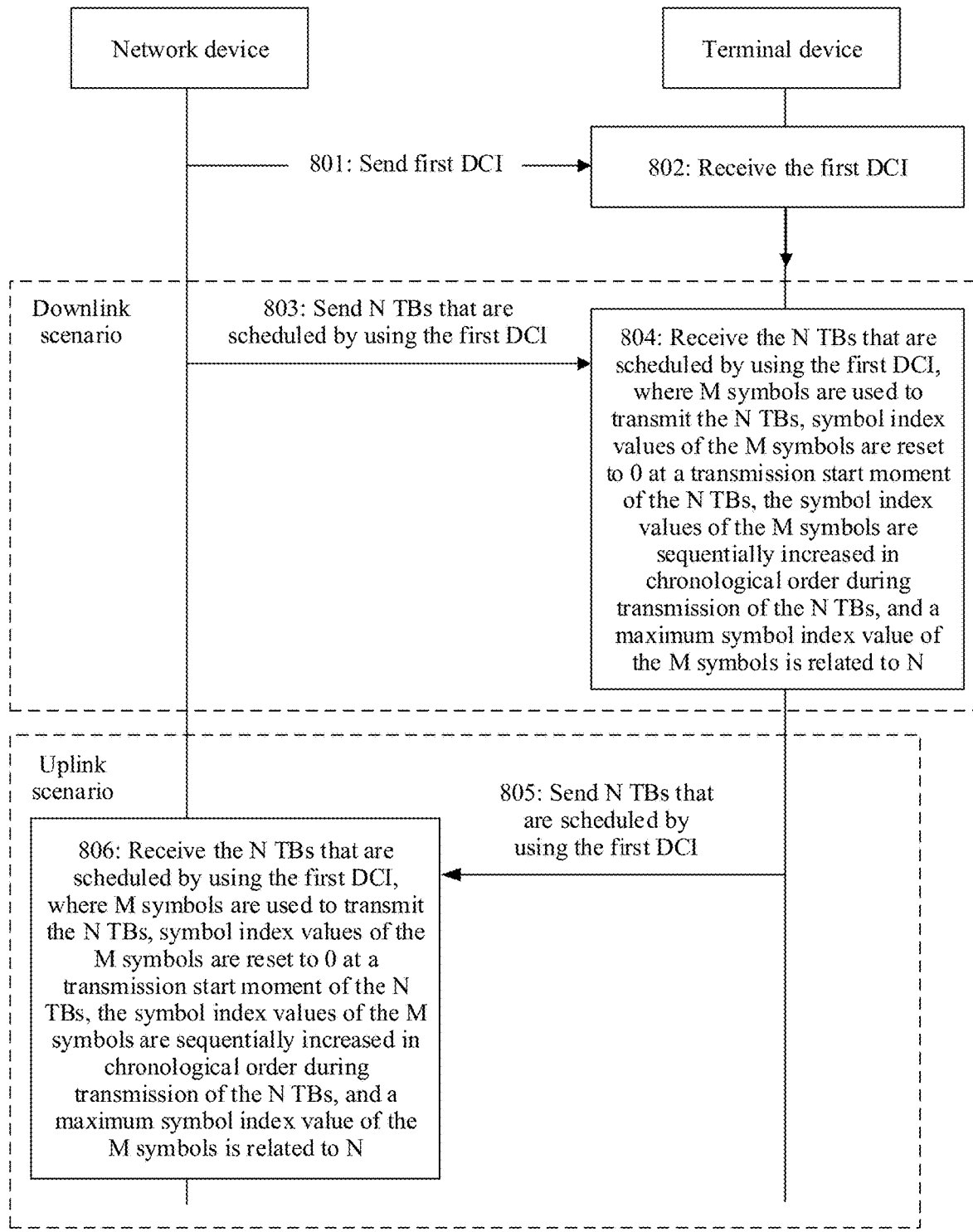
FIG. 8 is a schematic diagram of a third communication method according to an embodiment of this application.

FIG. 8 is a schematic flowchart of a third communication method according to an embodiment of this application. Refer to FIG. 8. The method includes the following steps.

Step 801: A network device sends DCI to a terminal device. The DCI is used to indicate to schedule N transport data blocks TBs, where N is a positive integer, and N is greater than or equal to 2.

Step 802: The terminal device receives the DCI sent by the network device.

For a Downlink Scenario:

The method further includes: Step 803: The network device sends, to the terminal device, the N TBs that are scheduled by using the DCI. Step 804: Receive the N TBs sent by the network device, where M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N. A first phase component of a baseband signal of a symbol α in the M symbols is determined based on a symbol index value corresponding to the symbol α, and the symbol α is any one of the M symbols.

For an Uplink Scenario:

Step 805: The terminal device sends, to the network device, the N TBs that are scheduled by using the DCI. Step 806: The network device receives the N TBs sent by the terminal device, where M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N. A first phase component of a baseband signal of a symbol α in the M symbols is determined based on a symbol index value corresponding to the symbol α, and the symbol α is any one of the M symbols.

For example, the M symbols are SC-FDMA symbols, and include a data symbol and a reference signal symbol. A specific implementation of generating a baseband signal of each SC-FDMA symbol is as follows:

For transmission of a plurality of TBs, when an SC-FDMA baseband signal is generated, a phase rotation $\phi_{k,l}$ is determined as follows, where symbol numbers $\tilde{l}$ are counted from transmission of the first TB that is scheduled by using the DCI and are sequentially increased during transmission of the plurality of TBs that are scheduled by using the DCI. In this way, phase continuity of the plurality of TBs can be ensured, a low PAPR can be ensured, cross-subframe channel estimation can be easily implemented, and degradation of channel estimation performance caused by phase discontinuity can be avoided.

Figure 9:
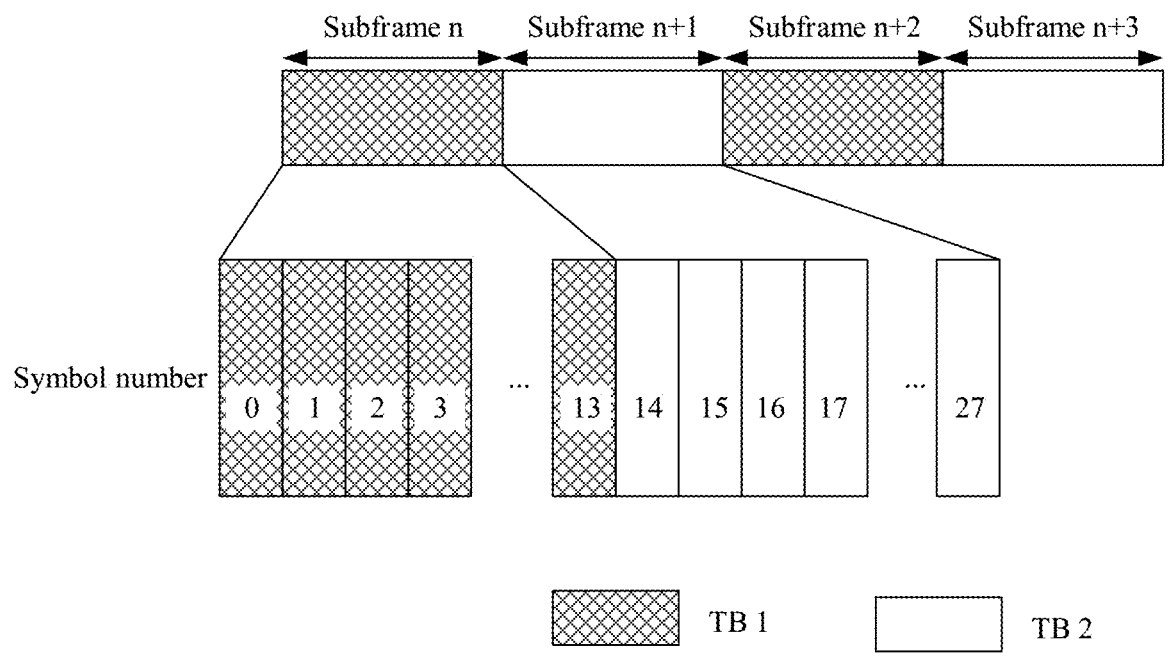
FIG. 9 is a schematic diagram of symbol numbers according to an embodiment of this application.

As shown in FIG. 9, the symbol numbers are counted from a TB 1 (from 0), and symbol numbers between the TB 1 and a TB 2 are sequentially increased (from 0 to 27).

An NB-IoT system is used as an example. For single-tone, for one SC-FDMA symbol, a time-continuous signal $s_{k,l}(t)$ corresponding to the SC-FDMA symbol satisfies the following formula 1 and formula 2:

$$s_{k,l}(t) = a_{k^{(-)},l} \cdot e^{j\phi_{k,l}} \cdot e^{j2\pi(k+1/2)\Delta f(t-N_{CP,l}T_s)} \qquad \text{Formula 1}$$

$$k^{(-)} = k + \lfloor N_{sc}^{UL}/2 \rfloor \qquad \text{Formula 2}$$

$0 \le t \le (N_{CP,l}+N)T_s$. For related parameters when $\Delta f=15$ kHz and $\Delta f=3.75$ kHz, refer to the following Table 5. In Table 5, l indicates a symbol index of one slot. $T_s$ indicates one time unit, and $T_s=1/(15000 \times 2040)$ seconds. $a_{k^{(-)},l}$ is a value obtained after a symbol l is modulated. j indicates a basic unit of a complex number, and $j=\sqrt{-1}$.

| Parameter | Δf = 3.75 kHz | Δf = 15 kHz |
|---|---|---|
| N | 8192 | 2048 |
| Cyclic prefix length $N_{CP,l}$ | 256 | 160 for l = 0<br>144 for l = 1, 2, . . . , 6 |
| Value set of k | −24, −23, . . . , 23 | −6, −5, . . . , 5 |

The phase rotation $\phi_{k,l}$ satisfies the following formula 3, formula 4, formula 5, formula 6, and formula 7:

$$\phi_{k,l} = \rho(\tilde{l} \bmod 2) + \varphi_k(\tilde{l}) \qquad \text{Formula 3}$$

$$\rho = \begin{cases} \dfrac{\pi}{2} & \text{for } BPSK \\ \dfrac{\pi}{4} & \text{for } QPSK \end{cases} \qquad \text{Formula 4}$$

$$\varphi_k(\tilde{l}) = \begin{cases} 0 & \tilde{l} = 0 \\ \varphi_k(\tilde{l}-1) + 2\pi\Delta f(k+1/2) \dfrac{}{(N+N_{CP,l})T_s} & \tilde{l} > 0 \end{cases} \qquad \text{Formula 5}$$

$$\tilde{l} = 0, 1, \ldots, N_{TB} M_{rep}^{NPUSCH} N_{RU} N_{slots}^{UL} N_{symb}^{UL} - 1 \qquad \text{Formula 6}$$

$$l = \tilde{l} \bmod N_{cymb}^{UL} \qquad \text{Formula 7}$$

$N_{TB}$ indicates a quantity of TBs that are scheduled by using the DCI, $M_{rep}^{NPUSCH}$ is a repetition quantity of $TB_k$, $M_{rep}^{NPUSCH}$ is determined based on repetition quantity indication information in the DCI, $N_{RU}$ is a quantity of RUs to which an uplink data channel carrying $TB_k$ is mapped, $N_{RU}$ is determined based on resource allocation indication information in the DCI, $N_{slots}^{UL}$ is a quantity of consecutive slots in one RU, $N_{symb}^{UL}$ indicates a quantity of symbols included in one slot, and $TB_k$ is one of the N TBs.

It should be noted that, the symbol index values $\tilde{l}$ of the M symbols may be obtained based on the formula 6, or another formula that satisfies a condition corresponding to the formula 6.

SC-FDMA symbols in one slot are transmitted in ascending order of l from l=0. Start time of SC-FDMA symbols in one slot with l>0 is $(N_{CP,l}+N)T_s$. For a subcarrier spacing $\Delta f=3.75$ kHz, remaining 2304 $T_s$ in a time length $T_{slot}$ of one slot is used as a guard period, and is not used for data transmission.

In this embodiment of this application, the first phase component may be $\phi_{k,l}$.

In this embodiment of this application, phase continuity of the plurality of TBs can be ensured, a low PAPR can be ensured, cross-subframe channel estimation can be easily implemented, and degradation of channel estimation performance caused by phase discontinuity can be avoided.

Figure 10:
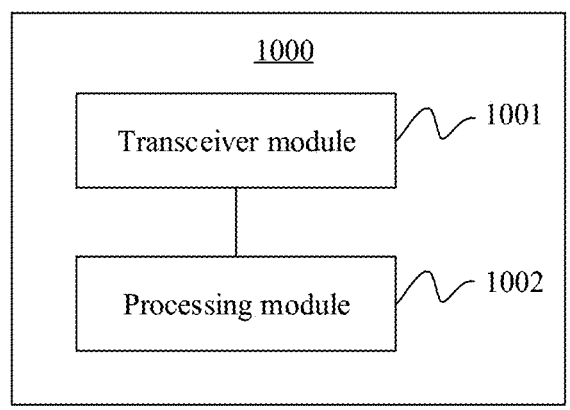
FIG. 10 is a schematic diagram of a structure of a communication apparatus according to an embodiment of this application.

FIG. 10 is a schematic diagram of a structure of a communication apparatus according to an embodiment of this application. The communication apparatus may be configured to perform an action of the terminal device in the embodiment of the first communication method. The communication apparatus 1000 includes a transceiver module 1001 and a processing module 1002.

The transceiver module 1001 is configured to receive first indication information sent by a network device.

The processing module 1002 is configured to determine a target transmission mode of N TBs based on the first indication information, where the target transmission mode is a sequential transmission mode or an interleaved transmission mode, and the N TBs are scheduled by using downlink control information DCI.

The transceiver module 1001 is further configured to receive the N TBs from the network device based on the target transmission mode.

In a possible embodiment, the first indication information is used to indicate that the target transmission mode of the terminal device is the sequential transmission mode or the interleaved transmission mode; and the processing module 1002 is specifically configured to: when the first indication information indicates that the target transmission mode of the terminal device is the interleaved transmission mode, determine that the target transmission mode is the interleaved transmission mode; or when the first indication information indicates that the target transmission mode of the terminal device is the sequential transmission mode, determine that the target transmission mode is the sequential transmission mode.

In a possible embodiment, the first indication information includes a maximum repetition quantity $R_{max}$ of a downlink control channel; and the processing module 1002 is specifically configured to: when $R_{max}$ is greater than or equal to a first threshold, determine that the target transmission mode is the interleaved transmission mode; or when $R_{max}$ is less than a first threshold, determine that the target transmission mode is the sequential transmission mode. In this embodiment of this application, the target transmission mode is implicitly indicated by using the maximum repetition quantity of the downlink control channel. Compared with specifying the target transmission mode by using explicit signaling, this can reduce signaling overheads. When $R_{max}$ is greater than or equal to the first threshold, it indicates that downlink coverage is poor or downlink channel quality is poor; in this case, usually, the transmission duration of the terminal device is long, and the terminal device determines that the target transmission mode is the interleaved transmission mode. In this case, a high time diversity gain can be obtained by using the interleaved transmission mode. When $R_{max}$ is less than the first threshold, it indicates that downlink coverage is good or downlink channel quality is good; in this case, usually, the transmission duration of the terminal device is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible embodiment, the first indication information is carried in the DCI; the first indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity N_SF of subframes to which a downlink data channel carrying $TB_k$ is mapped; and $TB_k$ is one of the N TBs. The processing module 1002 is specifically configured to: when $M_{rep}^{NPDSCH} \times N_{SF}$ is greater than or equal to a second threshold, determine that the target transmission mode is the interleaved transmission mode; or when $M_{rep}^{NPDSCH} \times N_{SF}$ is less than a second threshold, determine that the target transmission mode is the sequential transmission mode. In this embodiment of this application, the target transmission mode is implicitly indicated by using scheduling information, the repetition quantity indication information, and the resource allocation indication information in the DCI. Compared with specifying the target transmission mode by using explicit signaling, this can reduce signaling overheads. When $M_{rep}^{NPDSCH} \times N_{SF}$ is greater than or equal to the second threshold, it indicates that transmission duration is long, and the terminal device determines that the target transmission mode is the interleaved transmission mode. In this case, a high time diversity gain can be obtained by using the interleaved transmission mode. When $M_{rep}^{NPDSCH} \times N_{SF}$ is less than the second threshold, it indicates that transmission duration is short, and the terminal device determines that the target transmission mode is the sequential transmission mode. In this case, a time diversity gain is low, and implementation is simple by using the sequential transmission mode, thereby reducing the impact on hardware of the terminal device. For example, lower requirements are imposed on storage, a processing capability, or the like in the sequential transmission mode than in the interleaved transmission mode.

In a possible embodiment, the first indication information is carried in the DCI; the first indication information includes a modulation and coding scheme MCS of $TB_k$; and $TB_k$ is one of the N TBs. The processing module 1002 is specifically configured to: when the MCS is less than or equal to a third threshold, determine that the target transmission mode is the interleaved transmission mode; or when the MCS is greater than a third threshold, determine that the target transmission mode is the sequential transmission mode.

In a possible embodiment, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode of the terminal device is the interleaved transmission mode or the sequential transmission mode. The processing module 1002 is specifically configured to: if the third indication information is used to indicate that the target transmission mode of the terminal device is the interleaved transmission mode, when the third indication information indicates that the target transmission mode is the interleaved transmission mode, and $M_{rep}^{NPDSCH}$ and $N_{SF}$ that are determined based on the second indication information satisfy that $M_{rep}^{NPDSCH} \times N_{SF}$ is greater than or equal to a second threshold, determine that the target transmission mode is the interleaved transmission mode; or when the third indication information indicates that the target transmission mode is the interleaved transmission mode, determine that the target transmission mode is the interleaved transmission mode; and then when $M_{rep}^{NPDSCH}$ and $N_{SF}$ that are determined based on the second indication information satisfy that $M_{rep}^{NPDSCH} \times N_{SF}$ is less than a second threshold, determine that the target transmission mode is the sequential transmission mode; or when the third indication information indicates that the target transmission mode is the sequential transmission mode, determine that the target transmission mode is the sequential transmission mode.

In a possible embodiment, when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes, where p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

Figure 11:
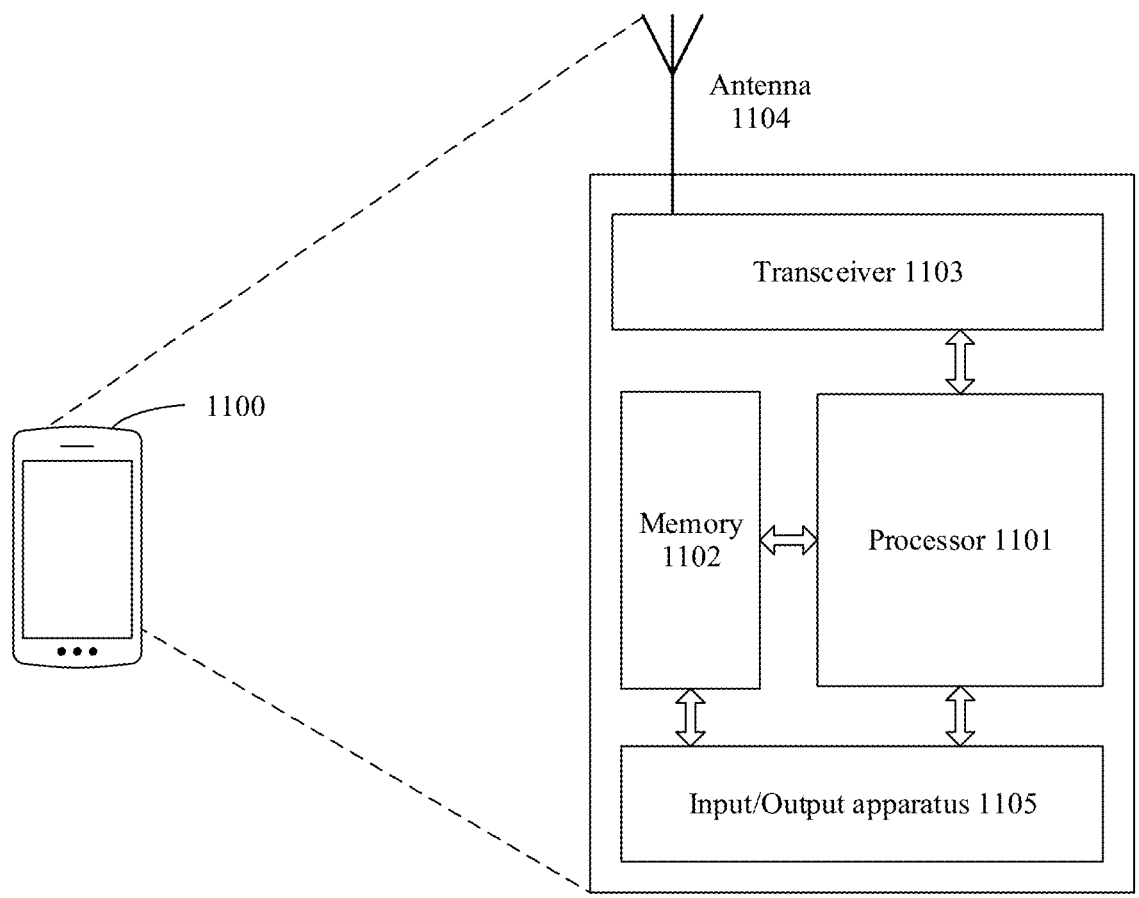
FIG. 11 is a schematic diagram of a structure of a communication apparatus according to an embodiment of this application.

FIG. 11 is a schematic diagram of a structure of a terminal device according to an embodiment of this application. The terminal device shown in FIG. 11 may be an implementation of a hardware circuit of the communication apparatus shown in FIG. 10. The terminal device is applicable to the flowcharts shown above, and performs functions of the terminal device in the foregoing method embodiments. For ease of description, FIG. 11 shows only main components of the terminal device. Optionally, the terminal device may alternatively be an apparatus in the terminal device, for example, a chip or a chip system. The chip system includes at least one chip. The chip system may further include another circuit structure and/or a discrete device. As shown in FIG. 11, the terminal device 1100 includes a processor 1101, a memory 1102, a transceiver 1103, an antenna 1104, and an input/output apparatus 1105. The processor 1101 is mainly configured to: process a communication protocol and communication data, control the entire wireless communication apparatus, execute a software program, and process data of the software program. For example, the processor 1101 is configured to support the wireless communication apparatus in performing an action described in the foregoing method embodiments. The memory 1102 is mainly configured to store a software program and data. The transceiver 1103 is mainly configured to receive first indication information, DCI, and the like that are sent by a network device. The antenna 1104 is mainly configured to receive and send a radio frequency signal in an electromagnetic wave form. The input/output apparatus 1105, such as a touchscreen, a display screen, or a keyboard, is mainly configured to: receive data entered by a user and output data to the user.

The processor 1101 determines a target transmission mode of N TBs based on the first indication information, where the target transmission mode is a sequential transmission mode or an interleaved transmission mode, and the N TBs are scheduled by using the downlink control information DCI.

The transceiver 1103 is further configured to receive the N TBs from the network device based on the target transmission mode.

In a possible embodiment, the processor 1101 is specifically configured to: when the first indication information indicates that the target transmission mode of the terminal device is the interleaved transmission mode, determine that the target transmission mode is the interleaved transmission mode; or when the first indication information indicates that the target transmission mode of the terminal device is the sequential transmission mode, determine that the target transmission mode is the sequential transmission mode.

In a possible embodiment, the first indication information includes a maximum repetition quantity $R_{max}$ of a downlink control channel; and the processor 1101 is specifically configured to: when $R_{max}$ is greater than or equal to a first threshold, determine that the target transmission mode is the interleaved transmission mode; or when $R_{max}$ is less than a first threshold, determine that the target transmission mode is the sequential transmission mode.

In a possible embodiment, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity N_SF of subframes to which a downlink data channel carrying $TB_k$ is mapped; and $TB_k$ is one of the N TBs. The processor 1101 is specifically configured to: when $M_{rep}^{NPUSCH} \times N_{SF}$ is greater than or equal to a second threshold, determine that the target transmission mode is the interleaved transmission mode; or when $M_{rep}^{NPUSCH} \times N_{SF}$ is less than a second threshold, determine that the target transmission mode is the sequential transmission mode.

In a possible embodiment, the first indication information is carried in the DCI; the first indication information includes a modulation and coding scheme MCS of $TB_k$; and $TB_k$ is one of the N TBs. The processor 1101 is specifically configured to: when the MCS is less than or equal to a third threshold, determine that the target transmission mode is the interleaved transmission mode; or when the MCS is greater than a third threshold, determine that the target transmission mode is the sequential transmission mode.

In a possible embodiment, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode of the terminal device is the interleaved transmission mode or the sequential transmission mode. The processor 1101 is specifically configured to: if the third indication information is used to indicate that the target transmission mode of the terminal device is the interleaved transmission mode, when the third indication information indicates that the target transmission mode is the interleaved transmission mode, and $M_{rep}^{NPUSCH}$ and $N_{SF}$ that are determined based on the second indication information satisfy that $M_{rep}^{NPDSCH} \times N_{SF}$ is greater than or equal to a second threshold, determine that the target transmission mode is the interleaved transmission mode; or when the third indication information indicates that the target transmission mode is the interleaved transmission mode, determine that the target transmission mode is the interleaved transmission mode; and then when $M_{rep}^{NPDSCH}$ and $N_{SF}$ that are determined based on the second indication information satisfy that $M_{rep}^{NPDSCH} \times N_{SF}$ is less than a second threshold, determine that the target transmission mode is the sequential transmission mode; or when the third indication information indicates that the target transmission mode is the sequential transmission mode, determine that the target transmission mode is the sequential transmission mode.

In a possible embodiment, when the target transmission mode is the interleaved transmission mode, an interleaving granularity of the N TBs is $p \times N_{SF} \times \min(M_{rep}^{NPDSCH}, 4)$ subframes; or an interleaving granularity of the N TBs is $p \times \min(M_{rep}^{NPUSCH}, 4)$ subframes, where p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

In an example, with reference to the communication apparatus shown in FIG. 10, the transceiver module 1001 in FIG. 10 may be implemented by the transceiver 1103 in FIG. 11, and the processing module 1002 in FIG. 10 may be implemented by the processor 1101 in FIG. 11. This is not limited in this embodiment of this application.

The communication apparatus shown in FIG. 10 may be further configured to perform an action of the terminal device in the embodiment of the second communication method.

The transceiver module 1001 is configured to receive first indication information sent by a network device.

The processing module 1002 is configured to determine a target transmission mode of N TBs based on the first indication information, where the target transmission mode is a sequential transmission mode or an interleaved transmission mode, and the N TBs are scheduled by using downlink control information DCI.

The transceiver module 1001 is further configured to send the N TBs to the network device based on the target transmission mode.

In a possible embodiment, the first indication information is used to indicate that the target transmission mode of the terminal device is the sequential transmission mode or the interleaved transmission mode; and the processing module 1002 is further configured to: when the first indication information indicates that the target transmission mode of the terminal device is the interleaved transmission mode, determine that the target transmission mode is the interleaved transmission mode; or when the first indication information indicates that the target transmission mode of the terminal device is the sequential transmission mode, determine that the target transmission mode is the sequential transmission mode.

In a possible embodiment, the first indication information is carried in the DCI; the first indication information includes subcarrier indication information and a modulation and coding scheme MCS of $TB_k$; the subcarrier indication information is used to determine a quantity $N_{sc}^{RU}$ of consecutive subcarriers occupied by $TB_k$ in one resource unit RU; and $TB_k$ is one of the N TBs. The processing module 1002 is further configured to: when $N_{sc}^{RU}$ is L, when the MCS is less than or equal to a fourth threshold, determine that the target transmission mode is the interleaved transmission mode; or when the MCS is greater than a fourth threshold, determine that the target transmission mode is the sequential transmission mode; or
  when $N_{sc}^{RU}$ is not L, when the MCS is less than or equal to a fifth threshold, determine that the target transmission mode is the sequential transmission mode; or when the MCS is greater than a fifth threshold, determine that the target transmission mode is the sequential transmission mode, where L is a positive integer.

In a possible embodiment, the first indication information is carried in the DCI; the first indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{RU}$ of RUs to which an uplink data channel carrying $TB_k$ is mapped; and $TB_k$ is one of the N TBs. The processing module 1002 is further configured to:
  when $M_{rep}^{NPUSCH} \times N_{RU}$ is greater than or equal to a sixth threshold, determine that the target transmission mode is the interleaved transmission mode; or
  when $M_{rep}^{NPDSCH} \times N_{RU}$ is less than a sixth threshold, determine that the target transmission mode is the sequential transmission mode, where $N_{slots}^{UL}$ is a quantity of consecutive slots in one RU.

In a possible embodiment, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs. The processing module 1002 is further configured to: when $N_{sc}^{RU}$ is L, determine that the target transmission mode is the interleaved transmission mode; or when $N_{sc}^{RU}$ is not L, determine that the target transmission mode is the sequential transmission mode, where L is a positive integer.

In a possible embodiment, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; and $N_{sc}^{RU}$ is L. The processing module 1002 is further configured to: when a subcarrier spacing is 3.75 kHz, when $N_R U$ is greater than or equal to a seventh threshold, determine that the target transmission mode is the interleaved transmission mode; or when $N_{RU}$ is less than a seventh threshold, determine that the target transmission mode is the sequential transmission mode; or when a subcarrier spacing is 15 kHz, when $N_{RU} \times M_{rep}^{NPUSCH}$ is greater than or equal to an eighth threshold, determine that the target transmission mode is the interleaved transmission mode; or when $N_{RU} \times M_{rep}^{NPUSCH}$ is less than an eighth threshold, determine that the target transmission mode is the sequential transmission mode, where the eighth threshold is greater than or equal to the seventh threshold.

In a possible embodiment, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; $N_{sc}^{RU}$ is not equal to L; and L is a positive integer. The processing module 1002 is further configured to: when $N_{RU} \times M_{rep}^{NPDSCH}$ is greater than or equal to a ninth threshold, determine that the target transmission mode is the interleaved transmission mode; or when $N_{RU} \times M_{rep}^{NPUSCH}$ is less than a ninth threshold, determine that the target transmission mode is the sequential transmission mode.

In a possible embodiment, when the target transmission mode is the interleaved transmission mode, an interleaving granularity of the N TBs is ε RUs, or an interleaving granularity of the N TBs is $\varepsilon \times N_{RU} \times N_{slots}^{UL}$ slots. $N_{slots}^{UL}$ is the quantity of consecutive slots in one RU, $N_R U$ is the quantity of RUs to which the uplink data channel carrying $TB_k$ is mapped, $N_{RU}$ is determined based on the resource allocation indication information in the DCI, $TB_k$ is one of the N TBs, and c is a positive integer.

In a possible embodiment, when the target transmission mode is the interleaved transmission mode, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPDSCH}/2 \rceil, 4)$ slots. $N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPUSCH}$ is the repetition quantity of $TB_k$, $M_{rep}^{NPDSCH}$ is determined based on the repetition quantity indication information in the DCI, $TB_k$ is one of the N TBs, and p is a positive integer.

In a possible embodiment, when the target transmission mode is the interleaved transmission mode, when $N_{sc}^{RU}$ is L, an interleaving granularity of the N TBs is ε RUs, or an interleaving granularity of the N TBs is $\varepsilon \times N_{RU} \times N_{slots}^{UL}$ slots.

When the target transmission mode is the interleaved transmission mode, when $N_{sc}^{RU}$ is not L, an interleaving granularity of the N TBs is $p \times N_{RU} \times N_{slots}^{UL} \times \min(\lceil M_{rep}^{NPUSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPUSCH}/2 \rceil, 4)$ slots. $N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is the quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPDSCH}$ is the repetition quantity of $TB_k$, $M_{rep}^{NPDSCH}$ is determined based on the repetition quantity indication information in the DCI, $TB_k$ is one of the N TBs, and ε, p, and L are all positive integers.

In a possible embodiment, M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N.

A first phase component of a baseband signal of a symbol α in the M symbols is determined based on a symbol index value corresponding to the symbol α, and the symbol α is one of the M symbols.

In a possible embodiment, the symbol index values ĩ of the M symbols are ĩ=0, 1, . . . , $N \times M_{rep}^{NPDSCH} \times N_{RU} \times N_{slot}^{UL} \times N_{symb}^{UL} - 1$. $M_{rep}^{NPDSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols included in one slot, and $TB_k$ is one of the N TBs.

In addition, the terminal device shown in FIG. 11 may be configured to perform a function of the terminal device in the embodiment of the second communication method. The transceiver module 1001 in FIG. 10 may be implemented by the transceiver 1103 in FIG. 11, and the processing module 1002 in FIG. 10 may be implemented by the processor 1101 in FIG. 11. Details are not described in this embodiment of this application again.

Figure 12:
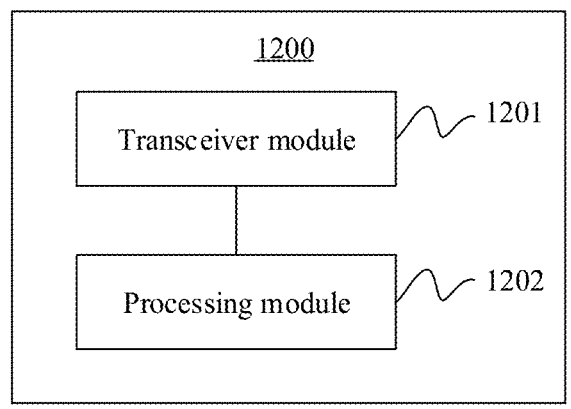
FIG. 12 is a schematic diagram of a structure of a communication apparatus according to an embodiment of this application.

FIG. 12 is a schematic diagram of a structure of a communication apparatus according to an embodiment of this application. The communication apparatus may be configured to perform an action of the network device in the method embodiments. The communication apparatus 1200 includes a transceiver module 1201 and a processing module 1202.

The processing module 1202 is configured to determine a target transmission mode.

The transceiver module 1201 is configured to: send first indication information to a terminal device, where the first indication information is used to indicate the target transmission mode; and send N TBs to a terminal device based on the target transmission mode, where the N TBs are scheduled by using downlink control information DCI.

In a possible embodiment, when it is determined that the target transmission mode is an interleaved transmission mode, the first indication information is used to indicate that the target transmission mode is the interleaved transmission mode; or when it is determined that the target transmission mode is the sequential transmission mode, the first indication information is used to indicate that the target transmission mode is the sequential transmission mode.

In a possible embodiment, the first indication information includes a maximum repetition quantity $R_{max}$ of a downlink control channel.

When the network device determines that the target transmission mode is the interleaved transmission mode, $R_{max}$ is greater than or equal to a first threshold; or when the network device determines that the target transmission mode is the sequential transmission mode, $R_{max}$ is less than a first threshold.

In a possible embodiment, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{SF}$ of subframes to which a downlink data channel carrying $TB_k$ is mapped; and $TB_k$ is one of the N TBs. When it is determined that the target transmission mode is the interleaved transmission mode, $M_{rep}^{NPDSCH} \times N_{SF}$ is greater than or equal to a second threshold; or when it is determined that the target transmission mode is the sequential transmission mode, $M_{rep}^{NPUSCH} \times N_{SF}$ is less than a second threshold.

In a possible embodiment, the first indication information is carried in the DCI; the first indication information includes a modulation and coding scheme MCS of $TB_k$; and $TB_k$ is one of the N TBs. When it is determined that the target transmission mode is the interleaved transmission mode, the MCS is less than or equal to a third threshold; or when it is determined that the target transmission mode is the sequential transmission mode, the MCS is greater than a third threshold.

In a possible embodiment, the first indication information includes second indication information and third indication information; the second indication information is carried in the DCI; the second indication information includes repetition quantity indication information and resource allocation indication information; the repetition quantity indication information is used to determine a repetition quantity $M_{rep}^{N_{PUSCH}}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode of the terminal device is the interleaved transmission mode or the sequential transmission mode.

When it is determined that the target transmission mode is the interleaved transmission mode, the third indication information is used to indicate that the target transmission mode of the terminal device is the interleaved transmission mode, and $M_{rep}^{NPDSCH} \times N_{SF}$ is greater than or equal to a second threshold; or when it is determined that the target transmission mode is the sequential transmission mode, the third indication information is used to indicate that the target transmission mode of the terminal device is the sequential transmission mode, and $M_{rep}^{NPDSCH} \times N_{SF}$ is less than a second threshold.

In a possible embodiment, when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes.

p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

Figure 13:
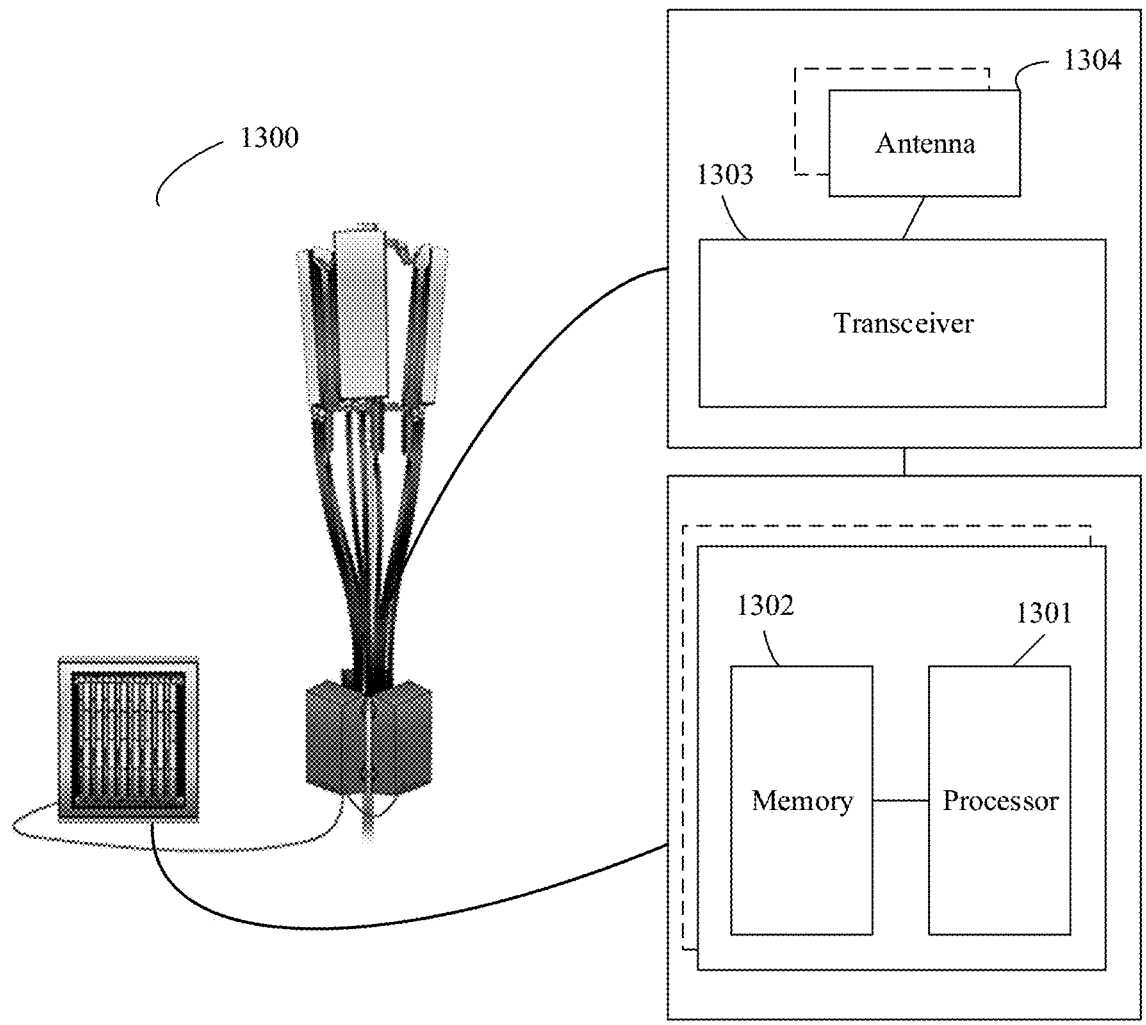
FIG. 13 is a schematic diagram of a structure of a communication apparatus according to an embodiment of this application.

FIG. 13 is a schematic diagram of a structure of a network device according to an embodiment of this application. The communication apparatus shown in FIG. 13 may be an implementation of a hardware circuit of the communication apparatus shown in FIG. 12. The communication apparatus is applicable to the flowchart shown in FIG. 3, and performs functions of the network device in the foregoing method embodiments. For ease of description, FIG. 13 shows only main components of the communication apparatus. Optionally, the communication apparatus may be a network device, or may be an apparatus in the network device, for example, a chip or a chip system. The chip system includes at least one chip, and the chip system may further include another circuit structure and/or a discrete device. Optionally, an example in which the communication apparatus is the network device is used. As shown in FIG. 13, the network device 1300 includes a processor 1301, a memory 1302, a transceiver 1303, an antenna 1304, and the like.

The processor 1301 is configured to determine a target transmission mode.

The transceiver 1303 is configured to: send first indication information to a terminal device, where the first indication information is used to indicate the target transmission mode; and send N TBs to the terminal device based on the target transmission mode, where the N TBs are scheduled by using downlink control information DCI.

In a possible embodiment, when it is determined that the target transmission mode is the interleaved transmission mode, the first indication information is used to indicate that the target transmission mode is the interleaved transmission mode; or when it is determined that the target transmission mode is the sequential transmission mode, the first indication information is used to indicate that the target transmission mode is the sequential transmission mode.

In a possible embodiment, the first indication information includes a maximum repetition quantity $R_{max}$ of a downlink control channel.

When the network device determines that the target transmission mode is the interleaved transmission mode, $R_{max}$ is greater than or equal to a first threshold; or when the network device determines that the target transmission mode is the sequential transmission mode, $R_{max}$ is less than a first threshold.

In a possible embodiment, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{SF}$ of subframes to which a downlink data channel carrying $TB_k$ is mapped; and $TB_k$ is one of the N TBs. When it is determined that the target transmission mode is the interleaved transmission mode, $M_{rep}^{NPDSCH} \times N_{SF}$ is greater than or equal to a second threshold; or when it is determined that the target transmission mode is the sequential transmission mode, $M_{rep}^{NPUSCH} \times N_{SF}$ is less than a second threshold.

In a possible embodiment, the first indication information is carried in the DCI; the first indication information includes a modulation and coding scheme MCS of $TB_k$; and $TB_k$ is one of the N TBs. When it is determined that the target transmission mode is the interleaved transmission mode, the MCS is less than or equal to a third threshold; or when it is determined that the target transmission mode is the sequential transmission mode, the MCS is greater than a third threshold.

In a possible embodiment, the first indication information includes second indication information and third indication information; the second indication information is carried in the DCI; the second indication information includes repetition quantity indication information and resource allocation indication information; the repetition quantity indication information is used to determine a repetition quantity $M_{rep}^{NPDSCH}$ of $TB_k$; the resource allocation indication information is used to determine a quantity $N_{SF}$ of subframes to which a downlink data channel carrying $TB_k$ is mapped; $TB_k$ is one of the N TBs; and the third indication information is used to indicate that the target transmission mode of the terminal device is the interleaved transmission mode or the sequential transmission mode.

When it is determined that the target transmission mode is the interleaved transmission mode, the third indication information is used to indicate that the target transmission mode of the terminal device is the interleaved transmission mode, and $M_{rep}^{NPUSCH} \times N_{SF}$ is greater than or equal to a second threshold; or when it is determined that the target transmission mode is the sequential transmission mode, the third indication information is used to indicate that the target transmission mode of the terminal device is the sequential transmission mode, and $M_{rep}^{NPDSCH} \times N_{SF}$ is less than a second threshold.

In a possible embodiment, when the target transmission mode is the interleaved transmission mode, an interleaving granularity of the N TBs is $p \times N_{SF} \times \min(M_{rep}^{NPDSCH}, 4)$ subframes; or an interleaving granularity of the N TBs is $p \times \min(M_{rep}^{NPDSCH}, 4)$ subframes.

p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPDSCH}$ is the repetition quantity of $TB_k$, $M_{rep}^{NPUSCH}$ is determined based on the repetition quantity indication information in the DCI, and $TB_k$ is one of the N TBs.

The communication apparatus shown in FIG. 12 may be further configured to perform an action of the terminal device in the embodiment of the second communication method.

The transceiver module 1201 is configured to receive first indication information sent by a network device.

The processing module 1202 is configured to: send first indication information to the terminal device, where the first indication information is used to indicate the target transmission mode; and receive, based on the target transmission mode, N TBs sent by the terminal device, where the N TBs are scheduled by using downlink control information DCI.

In a possible embodiment, when it is determined that the target transmission mode is an interleaved transmission mode, the first indication information is used to indicate that the target transmission mode is the interleaved transmission mode; or
  when it is determined that the target transmission mode is a sequential transmission mode, the first indication information is used to indicate that the target transmission mode is the sequential transmission mode.

In a possible embodiment, the first indication information is carried in the DCI; the first indication information includes subcarrier indication information and a modulation and coding scheme MCS of $TB_k$; the subcarrier indication information is used to determine a quantity $N_{sc}^{RU}$ of consecutive subcarriers occupied by $TB_k$ in one resource unit RU; and $TB_k$ is one of the N TBs.

When $N_{sc}^{RU}$ is L, when it is determined that the target transmission mode is the interleaved transmission mode, the MCS is less than or equal to a fourth threshold; or when it is determined that the target transmission mode is the sequential transmission mode, the MCS is greater than a fourth threshold.

When $N_{sc}^{RU}$ is not L, when it is determined that the target transmission mode is the interleaved transmission mode, the MCS is less than or equal to a fifth threshold; or when it is determined that the target transmission mode is the sequential transmission mode, the MCS is greater than a fifth threshold, where L is a positive integer.

In a possible embodiment, the first indication information is carried in the DCI; the first indication information includes repetition quantity indication information and resource allocation indication information; the repetition quantity indication information is used to determine a repetition quantity $M_{rep}^{NPUSCH}$ of $TB_k$; the resource allocation indication information is used to determine a quantity $N_{RU}$ of RUs to which an uplink data channel carrying $TB_k$ is mapped; and $TB_k$ is one of the N TBs.

When it is determined that the target transmission mode is the interleaved transmission mode, $M_{rep}^{NPDSCH} \times N_{RU}$ is greater than or equal to a sixth threshold; or
  when it is determined that the target transmission mode is the sequential transmission mode, $M_{rep}^{NPDSCH} \times N_{RU}$ is less than a sixth threshold.

In a possible embodiment, the first indication information is carried in the DCI; the first indication information includes subcarrier indication information; the subcarrier indication information is used to determine a quantity $N_{sc}^{RU}$ of consecutive subcarriers occupied by $TB_k$ in one RU; and $TB_k$ is one of the N TBs.

When it is determined that the target transmission mode is the sequential transmission mode, $N_{sc}^{RU}$ is L; or
  when it is determined that the target transmission mode is the interleaved transmission mode, $N_{sc}^{RU}$ is not L, where L is a positive integer.

In a possible embodiment, the first indication information is carried in the DCI; the first indication information includes subcarrier indication information, resource allocation indication information, and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; and $N_{sc}^{RU}$ is L.

When a subcarrier spacing is 3.75 kHz, when it is determined that the target transmission mode is the interleaved transmission mode, $N_{RU}$ is greater than or equal to a seventh threshold; or
  when it is determined that the target transmission mode is the sequential transmission mode, $N_{RU}$ is less than a seventh threshold.

When a subcarrier spacing is 15 kHz, when it is determined that the target transmission mode is the interleaved transmission mode, $N_{RU} \times M_{rep}^{NPDSCH}$ is greater than or equal to an eighth threshold; or when it is determined that the target transmission mode is the sequential transmission mode, $N_{RU} \times M_{rep}^{NPUSCH}$ is less than an eighth threshold, where the eighth threshold is greater than or equal to the seventh threshold.

In a possible embodiment, the first indication information is carried in the DCI; the first indication information includes resource allocation indication information and repetition quantity indication information; the subcarrier indication information is used to determine a quantity $N_{sc}^{RU}$ of consecutive subcarriers occupied by $TB_k$ in one RU; the resource allocation indication information is used to determine a quantity $N_{RU}$ of RUs to which an uplink data channel carrying $TB_k$ is mapped; the repetition quantity indication information is used to determine a repetition quantity $M_{rep}^{NPUSCH}$ of $TB_k$; $TB_k$ is one of the N TBs; $N_{sc}^{RU}$ is not equal to L; and L is a positive integer.

When it is determined that the target transmission mode is the interleaved transmission mode, $N_{RU} \times M_{rep}^{NPUSCH}$ is greater than or equal to a ninth threshold; or when it is determined that the target transmission mode is the sequential transmission mode, $N_{RU} \times M_{rep}^{NPDSCH}$ is less than the ninth threshold.

In a possible embodiment, when the target transmission mode is the interleaved transmission mode, an interleaving granularity of the N TBs is ε RUs, or an interleaving granularity of the N TBs is $\varepsilon \times N_{RU} \times N_{slots}^{UL}$ slots.

$N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

In a possible embodiment, when the target transmission mode is the interleaved transmission mode, an interleaving granularity of the N TBs is $p \times N_{RU} \times N_{slots}^{UL} \times \min(\lceil M_{rep}^{NPDSCH}/2 \rceil, 4)$ slots, or an interleaving granularity of the N TBs is $p \times \min(\lceil M_{rep}^{NPDSCH}/2 \rceil, 4)$ subframes, or an interleaving granularity of the N TBs is $2 \times p \times \min(\lceil M_{rep}^{NPDSCH}/2 \rceil, 4)$ slots.

$N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPDSCH}$ is the repetition quantity of $TB_k$, $M_{rep}^{NPDSCH}$ is determined based on the repetition quantity indication information in the DCI, $TB_k$ is one of the N TBs, and p is a positive integer.

In a possible embodiment, when the target transmission mode is the interleaved transmission mode, when $N_{sc}^{RU}$ is L, an interleaving granularity of the N TBs is ε RUs, or an interleaving granularity of the N TBs is $ε×N_{RU}×N_{slots}^{UL}$ slots.

When the target transmission mode is the interleaved transmission mode, when $N_{sc}^{RU}$ is not L, an interleaving granularity of the N TBs is $p×N_{RU}×N_{slots}^{UL}×\min(\lceil M_{rep}^{NPUSCH}/2\rceil,4)$ slots, or an interleaving granularity of the N TBs is $p×\min(\lceil M_{rep}^{NPDSCH}/2\rceil,4)$ subframes, or an interleaving granularity of the N TBs is $2×p×\min(\lceil M_{rep}^{NPDSCH}/2\rceil,4)$ slots.

$N_{sc}^{RU}$ is the quantity of consecutive subcarriers occupied by $TB_k$ in one RU, $N_{sc}^{RU}$ is determined based on the subcarrier indication information included in the DCI, $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $M_{rep}^{NPDSCH}$ is the repetition quantity of $TB_k$, $M_{rep}^{NPDSCH}$ is determined based on the repetition quantity indication information in the DCI, $TB_k$ is one of the N TBs, and ε, p, and L are all positive integers.

In a possible embodiment, M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N.

A first phase component of a baseband signal of a symbol α in the M symbols is determined based on a symbol index value corresponding to the symbol α, and the symbol α is one of the M symbols.

In a possible embodiment, the symbol index values $\tilde{l}$ of the M symbols are $\tilde{l}=0, 1, \ldots, N×M_{rep}^{NPUSCH}×N_{RU}×N_{slots}^{UL}×N_{symb}^{UL}-1$.

$M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols included in one slot, and $TB_k$ is one of the N TBs.

In addition, the network device shown in FIG. 13 may be further configured to perform a function of the network device in the embodiment of the second communication method. The transceiver module 1201 in FIG. 12 may be implemented by the transceiver 1303 in FIG. 13, and the processing module 1202 in FIG. 12 may be implemented by the processor 1301 in FIG. 13. Details are not described in this embodiment of this application again.

Based on a same idea as the foregoing method embodiment, an embodiment of this application further provides a computer-readable storage medium. The computer-readable storage medium stores some instructions. When these instructions are invoked and executed by a computer, the computer may be enabled to complete the method in any one of the foregoing method embodiment or the possible designs of the foregoing method embodiment. In this embodiment of this application, the computer-readable storage medium is not limited. For example, the computer-readable storage medium may be a RAM or a ROM.

Based on a same idea as the foregoing method embodiment, this application further provides a computer program product. When being invoked and executed by a computer, the computer program product can complete the method in any one of the foregoing method embodiment and the possible designs of the foregoing method embodiment.

Based on a same idea as the foregoing method embodiment, this application further provides a chip. The chip may include a processor and an interface circuit, to complete the method in any one of the foregoing method embodiment and the possible implementations of the foregoing method embodiment. "Couple" means that two components are directly or indirectly combined with each other. The combination may be fixed or movable, and the combination may allow communication of fluid, electricity, an electrical signal, or another type of signal between two components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of the present invention are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC, and the ASIC may be disposed in a terminal device. Optionally, the processor and the storage medium may alternatively be disposed in different components of the terminal device.

These computer program instructions may alternatively be loaded onto a computer or another programmable data processing device, so that a series of operation steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

Although the present invention is described with reference to specific features and the embodiments thereof, it is clear that various modifications and combinations may be made to them without departing from the scope of the present invention. Correspondingly, the specification and the accompanying drawings are merely examples of the present invention defined by the appended claims, and are considered as any of or all modifications, variations, combinations or equivalents that cover the scope of the present invention. It is clear that a person skilled in the art can make various modifications and variations to the present invention without departing from the spirit and scope of the present invention. In this way, the present invention is intended to cover these modifications and variations of the present invention provided that these modifications and variations fall within the scope of the claims of the present invention and equivalent technologies thereof.

What is claimed is:

1. A communication method, comprising:
receiving, by a terminal device, first indication information from a network device;
determining, by the terminal device, a target transmission mode of N transport blocks (TBs) based on the first indication information, wherein the target transmission mode is a sequential transmission mode or an interleaved transmission mode, and the N TBs are scheduled by using downlink control information (DCI); and
receiving, by the terminal device, the N TBs from the network device based on the target transmission mode; or, sending, by the terminal device, the N TBs to the network device based on the target transmission mode;
wherein when the target transmission mode is the interleaved transmission mode, an interleaving granularity of the N TBs is $p \times N_{SF} \times \min(M_{rep}^{NPUSCH}, 4)$ subframes; or
an interleaving granularity of the N TBs is $p \times \min(M_{rep}^{NPUSCH}, 4)$ subframes, wherein
p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

2. The method according to claim 1, the interleaving granularity of the N TBs is ε RUs, or the interleaving granularity of the N TBs is $\varepsilon \times N_{RU} \times N_{slots}^{UL}$ slots, wherein $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

3. The method according to claim 1, wherein
M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N, wherein
a first phase component of a baseband signal of a symbol α in the M symbols is determined based on a symbol index value corresponding to the symbol α, and the symbol α is one of the M symbols.

4. The method according to claim 3, wherein the symbol index values $\tilde{l}$ of the M symbols satisfy that $\tilde{l}=0, 1, \ldots, N \times M_{rep}^{NPDSCH} \times N_{RU} \times N_{slots}^{UL} \times N_{symb}^{UL} - 1$, wherein
$M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols comprised in one slot, and $TB_k$ is one of the N TBs.

5. A communication method, comprising:
determining, by a network device, a target transmission mode;
sending, by the network device, first indication information to a terminal device, wherein the first indication information is used to indicate the target transmission mode; and
sending, by the network device, N transport blocks (TBs) to the terminal device based on the target transmission mode wherein the N TBs are scheduled by using downlink control information (DCI);
wherein when the target transmission mode is the interleaved transmission mode, an interleaving granularity of the N TBs is $p \times N_{SF} \times \min(M_{rep}^{NPUSCH}, 4)$ subframes; or
an interleaving granularity of the N TBs is $p \times \min(M_{rep}^{NPUSCH}, 4)$ subframes, wherein
p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

6. The method according to claim 5, wherein the interleaving granularity of the N TBs is ε RUs, or the interleaving granularity of the N TBs is $\varepsilon \times N_{RU} \times N_{slots}^{UL}$ slots, wherein $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

7. The method according to claim 5, wherein

M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N, wherein a first phase component of a baseband signal of a symbol α in the M symbols is determined based on a symbol index value corresponding to the symbol α, and the symbol α is one of the M symbols.

8. The method according to claim 7, wherein the symbol index values $\tilde{l}$ of the M symbols satisfy that $\tilde{l}=0, 1, \ldots, N \times M_{rep}^{NPUSCH} \times N_{RU} \times N_{slots}^{UL} \times N_{symb}^{UL}-1$, wherein $M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols comprised in one slot, and $TB_k$ is one of the N TBs.

9. A terminal device, comprising:

at least one processor, and a memory, coupled to the at least one processor, storing program instructions, wherein when the instructions are executed by the at least one processor, the instructions cause the at least one processor to:

receive first indication information from a network device;

determine a target transmission mode of N transport blocks (TBs) based on the first indication information, wherein the target transmission mode is a sequential transmission mode or an interleaved transmission mode, and the N TBs are scheduled by using downlink control information (DCI); and receive the N TBs from the network device based on the target transmission mode; or, send the N TBs to the network device based on the target transmission mode;

wherein when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes, wherein p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

10. The terminal device according to claim 9, wherein the interleaving granularity of the N TBs is ε RUs, or the interleaving granularity of the N TBs is $\varepsilon \times N_{RU} \times N_{slots}^{UL}$ slots, wherein $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

11. The terminal device according to claim 9, wherein

M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N, wherein a first phase component of a baseband signal of a symbol α in the M symbols is determined based on a symbol index value corresponding to the symbol α, and the symbol α is one of the M symbols.

12. The terminal device according to claim 11, wherein the symbol index values $\tilde{l}$ of the M symbols satisfy that $\tilde{l}=0, 1, \ldots, N \times M_{rep}^{NPUSCH} \times N_{RU} \times N_{slots}^{UL} \times N_{symb}^{UL}-1$, wherein $M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slots}^{UL}$ is the quantity of consecutive slots in one RU, $N_{symb}^{UL}$ indicates a quantity of symbols comprised in one slot, and $TB_k$ is one of the N TBs.

13. A network device, comprising:

at least one processor, and a memory, coupled to the at least one processor, storing program instructions, wherein when the instructions are executed by the at least one processor, cause the at least one processor to:

determine, by a network device, a target transmission mode;

send, by the network device, first indication information to a terminal device, wherein the first indication information is used to indicate the target transmission mode; and send, by the network device, N transport blocks (TBs) to the terminal device based on the target transmission mode; wherein the N TBs are scheduled by using downlink control information DCI;

wherein when the target transmission mode is the interleaved transmission mode, an interleaving granularity of the N TBs is $p \times N_{SF} \times \min(M_{rep}^{NPUSCH}, 4)$ subframes; or an interleaving granularity of the N TBs is $p \times \min(M_{rep}^{NPUSCH}, 4)$ subframes, wherein p is a positive integer greater than or equal to 1, $N_{SF}$ is the quantity of subframes to which the downlink data channel carrying $TB_k$ is mapped, $N_{SF}$ is determined based on the resource allocation indication information in the DCI, $M_{rep}^{NPUSCH}$ is the repetition quantity of $TB_k$, $M_{rep}^{NPUSCH}$ is determined based on the repetition quantity indication information in the DCI, and $TB_k$ is one of the N TBs.

14. The network device according to claim 13, wherein the interleaving granularity of the N TBs is ε RUs, or the interleaving granularity of the N TBs is $\varepsilon \times N_{RU} \times N_{slots}^{UL}$ slots, wherein $N_{slots}^{UL}$ is a quantity of consecutive slots in one RU, $N_{RU}$ is the quantity of RUs to which the uplink data channel carrying $TB_k$ is mapped, $N_{RU}$ is determined based on the resource allocation indication information in the DCI, $TB_k$ is one of the N TBs, and ε is a positive integer.

15. The network device according to claim 13, wherein

M symbols are used to transmit the N TBs, symbol index values of the M symbols are reset to 0 at a transmission start moment of the N TBs, the symbol index values of the M symbols are sequentially increased in chronological order during transmission of the N TBs, and a maximum symbol index value of the M symbols is related to N, wherein a first phase component of a baseband signal of a symbol α in the M symbols is determined based on a symbol index value corresponding to the symbol α, and the symbol α is one of the M symbols.

16. The network device according to claim 15, wherein the symbol index values $\bar{l}$ of the M symbols satisfy that $\bar{l}=0, 1, \ldots, N \times M_{rep}^{NPUSCH} \times N_{RU} \times N_{slots}^{UL} \times N_{symb}^{UL} - 1$, wherein $M_{rep}^{NPUSCH}$ is the repetition quantity of $TB_k$, $M_{rep}^{NPUSCH}$ is determined based on the repetition quantity indication information in the DCI, $N_{RU}$ is the quantity of RUs to which the uplink data channel carrying $TB_k$ is mapped, $N_{RU}$ is determined based on the resource allocation indication information in the DCI, $N_{slot}^{UL}$ is the quantity of consecutive slots in one RU, $N_{symb}^{UL}$ indicates a quantity of symbols comprised in one slot, and $TB_k$ is one of the N TBs.

* * * * *

UNITED STATES PATENT AND TRADEMARK OFFICE
CERTIFICATE OF CORRECTION

PATENT NO. : 12,262,390 B2
APPLICATION NO. : 17/708307
DATED : March 25, 2025
INVENTOR(S) : Zhihu Luo et al.

Page 1 of 1

It is certified that error appears in the above-identified patent and that said Letters Patent is hereby corrected as shown below:

In the Drawings

Reference numeral 503, and on the title page, the illustrative print figure, Line 2, delete "infonnation" and insert -- information --, therefor.

In the Claims

In Column 60, Claim 4, Line 25, delete "$M_{rep}^{NPDSCH}$" and insert -- $M_{rep}^{NPUSCH}$ --, therefor.

In Column 60, Claim 5, Line 43, delete "mode wherein" and insert -- mode; wherein --, therefor.

In Column 63, Claim 16, Line 18, delete "$N_{slot}^{UL}$" and insert -- $N_{slots}^{UL}$ --, therefor.

Signed and Sealed this
Twenty-seventh Day of May, 2025

Coke Morgan Stewart
*Acting Director of the United States Patent and Trademark Office*